United States Patent
Shah

(10) Patent No.: US 9,483,479 B2
(45) Date of Patent: Nov. 1, 2016

(54) MAIN-MEMORY BASED CONCEPTUAL FRAMEWORK FOR FILE STORAGE AND FAST DATA RETRIEVAL

(71) Applicant: Dhwanit Shah, Bangalore (IN)

(72) Inventor: Dhwanit Shah, Bangalore (IN)

(73) Assignee: SAP SE, Walldorf (DE)

( * ) Notice: Subject to any disclaimer, the term of this patent is extended or adjusted under 35 U.S.C. 154(b) by 131 days.

(21) Appl. No.: 13/964,736

(22) Filed: Aug. 12, 2013

(65) Prior Publication Data
US 2015/0046494 A1    Feb. 12, 2015

(51) Int. Cl.
*G06F 17/30* (2006.01)

(52) U.S. Cl.
CPC ............... *G06F 17/30091* (2013.01)

(58) Field of Classification Search
CPC ............................... G06F 17/30091
USPC .................................. 707/783, 822
See application file for complete search history.

(56) References Cited

U.S. PATENT DOCUMENTS

| | | | |
|---|---|---|---|
| 5,544,302 A * | 8/1996 | Nguyen | 715/837 |
| 5,870,751 A | 2/1999 | Trotter | |
| 5,878,406 A * | 3/1999 | Noyes | 706/55 |
| 6,240,418 B1 | 5/2001 | Shadmon | |
| 6,499,032 B1 | 12/2002 | Tikkanen et al. | |
| 6,571,235 B1 | 5/2003 | Marpe et al. | |
| 6,691,282 B1 * | 2/2004 | Rochford et al. | 715/234 |
| 6,694,323 B2 | 2/2004 | Bumbulis | |
| 7,002,583 B2 * | 2/2006 | Rabb, III | G06T 3/0093 345/473 |
| 7,191,182 B2 * | 3/2007 | Anonsen et al. | |
| 7,383,274 B2 * | 6/2008 | Pearce | G06F 17/30067 |
| 7,650,357 B2 * | 1/2010 | Lin | G06F 17/30448 707/999.102 |
| 7,668,737 B2 * | 2/2010 | Streepy, Jr. | 705/3 |
| 8,131,739 B2 * | 3/2012 | Wu | G06F 17/30067 707/758 |
| 8,539,481 B2 * | 9/2013 | Smith | G06F 21/6281 718/1 |
| 2003/0009443 A1 | 1/2003 | Yatviskiy | |
| 2003/0145310 A1 | 7/2003 | Thames et al. | |
| 2005/0144162 A1 * | 6/2005 | Liang | 707/3 |
| 2005/0149510 A1 | 7/2005 | Shafrir | |
| 2007/0067366 A1 | 3/2007 | Landis | |
| 2009/0287674 A1 | 11/2009 | Bouillet et al. | |
| 2011/0047180 A1 * | 2/2011 | Prahlad et al. | 707/769 |
| 2011/0138123 A1 | 6/2011 | Gurajada et al. | |
| 2012/0323971 A1 | 12/2012 | Pasupuleti | |
| 2013/0006989 A1 | 1/2013 | Plattner et al. | |

(Continued)

OTHER PUBLICATIONS

Deissenboeck, Florian, et al., "A Unified Meta-Model for Concept-Based Reverse Engineering", ATEM '06, © 2006, 15 pages.*

(Continued)

*Primary Examiner* — Robert Stevens

(57) ABSTRACT

A conceptual framework is built including a conceptual hierarchy, a containment hierarchy, and concept relationships. The concepts created in the conceptual framework are associated with resources located on the local file system. The resources are stored in the conceptual framework that is stored in the main memory of the system. Thus, search capabilities based on complex multivariate queries involving relationships and multiple conditions between concepts are provided. The conceptual framework is based on an in-memory engine that enables superfast resource access, reduced file storage redundancy, reduced updating errors, increased consistency, greater data integrity and independence from application level programs, query based concept and file access.

17 Claims, 25 Drawing Sheets

(56) References Cited

U.S. PATENT DOCUMENTS

2013/0110496 A1  5/2013  Heidasch
2013/0132420 A1  5/2013  Vainer et al.

OTHER PUBLICATIONS

Gertz, Michael, et al., "Annotating Scientific Images: A Concept-based Approach", SSDBM '02, Edinburgh, Scotland, Jul. 24-26, 2002, pp. 59-68.*

Hsu, Fang-Ming, et al., "Segmenting customers by transaction data with concept hierarchy", Expert Systems with Applications, vol. 39, Issue 6, May 2012, pp. 6221-6228.*

Kemp, Zarine, et al., "Interoperability for Geospatial Analysis: a semantics and ontology-based approach", ADC 2007, Ballarat, Victoria, Australia, © 2007, Australian Computer Society, Inc., pp. 83-92.*

Lee, Ming Che, et al., "A multi-strategy knowledge interoperability framework for heterogeneous learning objects", Expert Systems with Applications, vol. 38, Issue 5, May 2011, pp. 4945-4956.*

Narayanan, Anantha, et al., "Automatic Domain Model Migration to Manage Metamodel Evolution", Models 2009, LNCS 5795, Springer-Verlag, Berlin, Germany, © 2009, pp. 706-711.*

Srinivasa, Srinath, "Aggregating Operational Knowledge in Community Settings", OTM 2012, Part II, LNCS 7566, Springer-Verlag, Berlin, Germany, © 2012, pp. 789-796.* van Gurp, J., et al., "Design, implementation and evolution of object oriented frameworks: concepts and guidelines", Software—Practice and Experience, vol. 31, © 2001, John Wiley & Sons, Ltd., pp. 277-300.*

Dyreson, Curtis E., et al., "Metaxpath", DC-2001, Tokyo, Japan, Oct. 24-26, 2001, © National Institute of Informatics, pp. 17-23.*

Melnik, Sergey, et al., "Dremel: Interactive Analysis of Web-Scale Datasets", Proc. of the VLDB Endowment, vol. 3, No. 1, © 2010 VLDB Endowment, presented at the 36th International Conf. on Very Large Data Bases, Singapore, Sep. 13-17, 2010, pp. 330-339.*

Microsoft Computer Dictionary. 5th Edition, Microsoft Press, Redmond, WA, (c) 2002 Microsoft Corp., p. 300.*

* cited by examiner

MAIN-MEMORY BASED CONCEPTUAL FRAMEWORK FOR FILE STORAGE AND FAST DATA RETRIEVAL

FIELD

The field generally relates to the software arts, and, more specifically, to methods and systems including main-memory based conceptual framework for file storage and fast data retrieval.

BACKGROUND

Many file systems are organized hierarchically and the data files stored on the file systems are traditionally organized hierarchically as well. A hierarchy is an arrangement of entities in which the entities are represented as being above, below, or at the same level one to another. The hierarchy is simply an ordered set or an acyclic graph. The entities in the hierarchy can be linked directly or indirectly, vertically or horizontally. In a simple scenario, when a user wants to reach and open a given file, the user can type a direct path to the file in a file system browser or search the file by some attributes as search criteria. In this case the search query may become too complex by including multiple search criteria. The system may take long time to display the needed files and data, where multivariate queries are submitted involving complex relationships between file metadata and their associated semantics. Traditional file system browsers do not support fast searching of files with complex queries including multiple search criteria.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for methods and systems including main-memory based conceptual framework for file storage and fast data retrieval are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

In an in-memory database, all relevant data is kept in the main memory. Disk based index structures, for example, are not needed any more for an in-memory database. Disk storage is still needed to make changes durable, but the required disk write operations happen asynchronously in the background. In addition, disk storage may be used to store aged data that is not needed any more during normal operations. One of the features of the in-memory database is provision of fast access when querying data.

In various embodiments, a conceptual framework for organizing files based on a conceptual hierarchy, a containment hierarchy, and concept relationships is presented. The conceptual framework is modeled and created relationally and the physical files pertaining to their corresponding concepts may be stored in an in-memory database. Thus, fast access to the stored concepts is available. Methods and systems are provided for manually mapping an existing hierarchical file storage system to the generated conceptual framework to provide the traditionally existing hierarchical file storage system along with the conceptual framework based file storage system. In this way, the user can speedily get needed files and data by submitting complex multivariate queries involving complex relationships between files metadata and their associated semantics.

Figure 1:
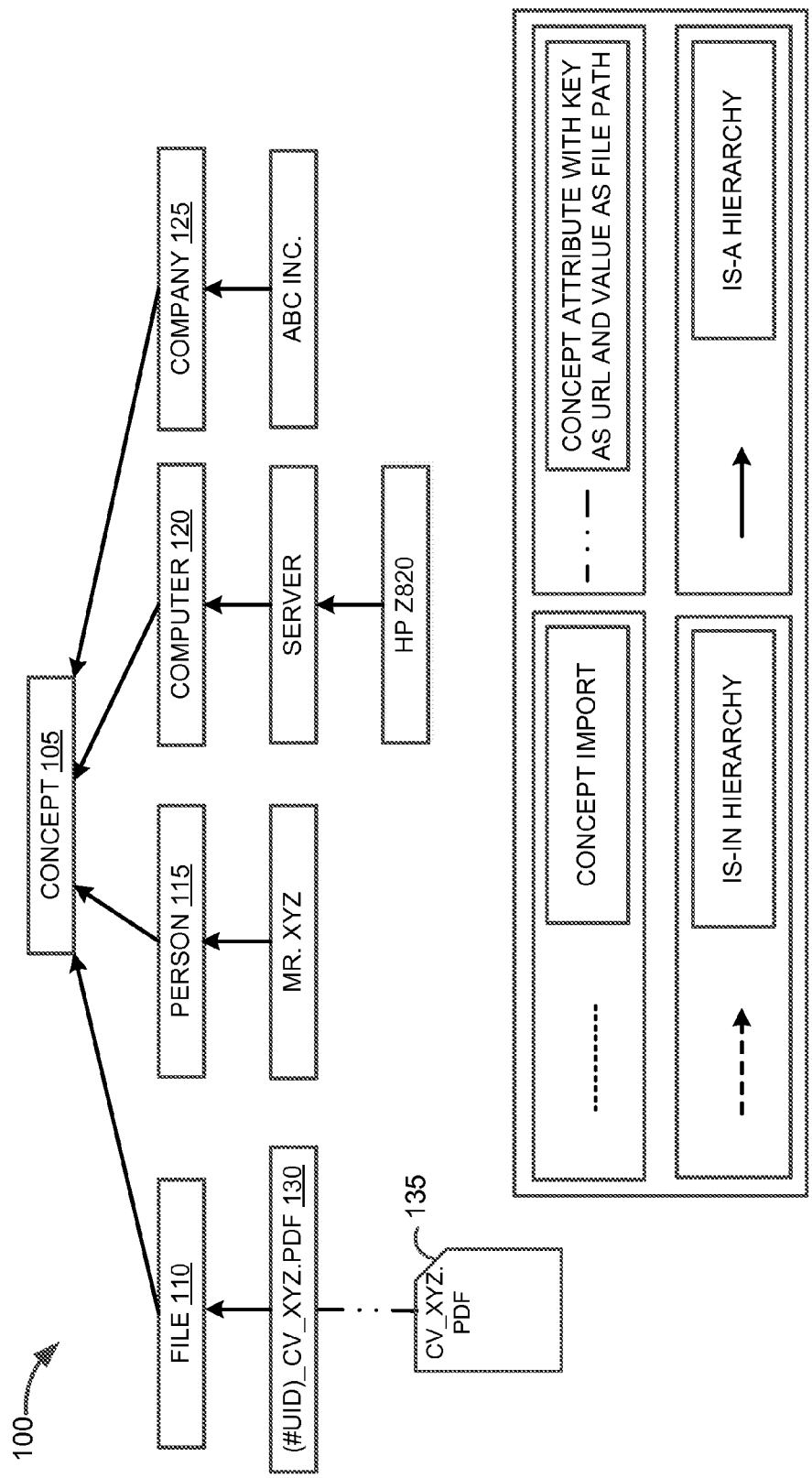
FIG. 1 is a block diagram illustrating an exemplary conceptual hierarchy.

FIG. 1 is a block diagram illustrating an exemplary conceptual hierarchy. A conceptual hierarchy is an IS-A hierarchy that defines an ontology-based data organization. An IS-A is a relationship, where one class A is a subclass of another class B and any object (or class) that satisfies A's specification also satisfies B's specification. The conceptual hierarchy can be used to model a given knowledge domain forming a hierarchy of all relevant entities. Conceptual hierarchy 100 represents an exemplary tree data structure including concepts and physical files associated with the concepts. Concept 105 is the root object of type "concept" in the conceptual hierarchy 100. File 110, person 115, computer 120, and company 125 are also modeled as objects of type "concept". (#UID)_CV_XYZ.pdf 130 is a concept associated with the file 110 concept of the conceptual hierarchy 100. Physical file CV_XYZ.pdf 135 is modeled as an attribute of (#UID)_CV_XYZ.pdf 130 concept. Physical file CV_XYZ.pdf 135 may be located on the file storage system or on the Internet and accessible via a URL defined as concept attribute key and a file path defined as concept attribute value.

Figure 2:
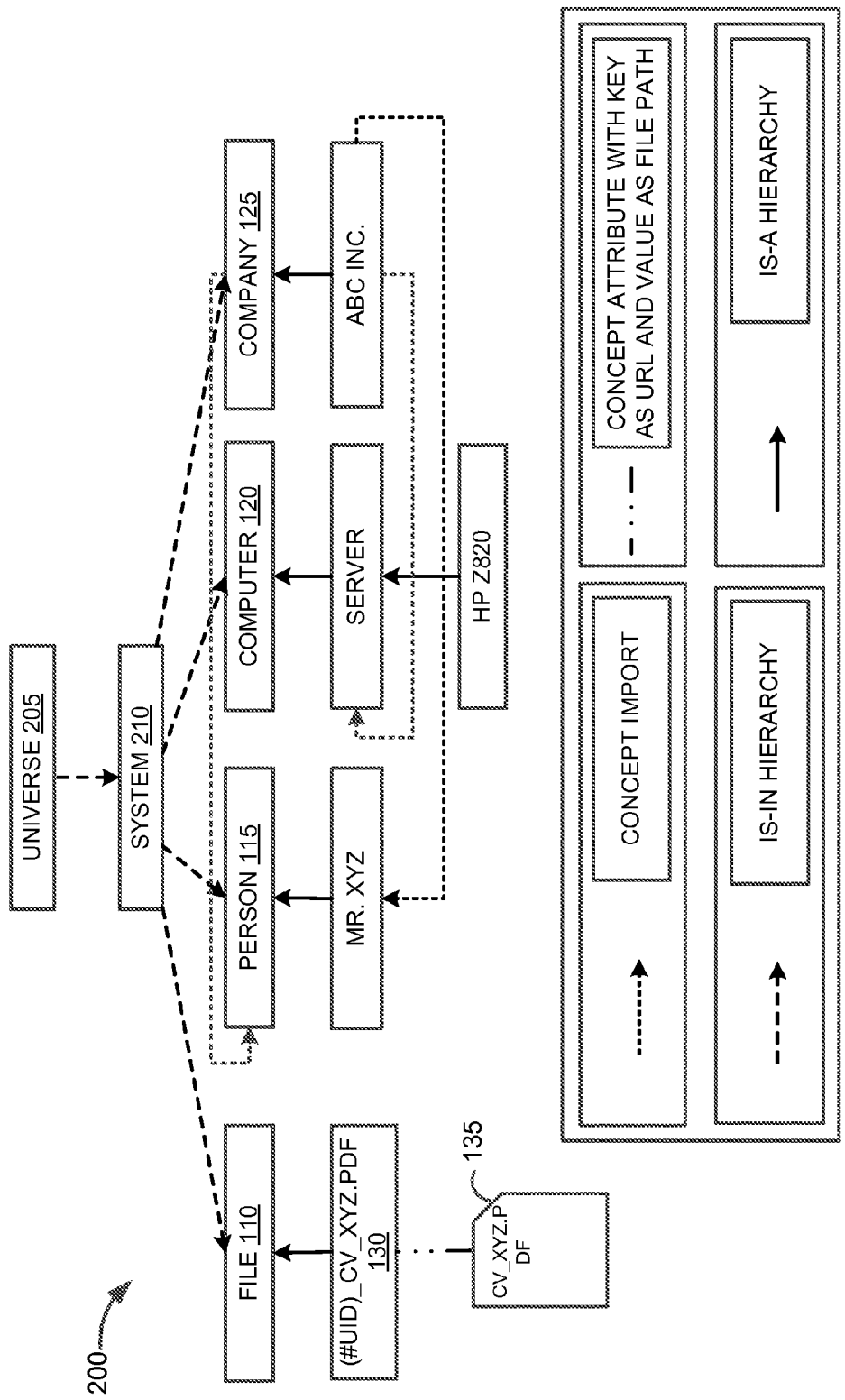
FIG. 2 is a block diagram illustrating an exemplary containment hierarchy.

FIG. 2 is a block diagram illustrating an exemplary containment hierarchy 200. A containment hierarchy is an IS-IN hierarchy is a nested organization of relevant entities of a given knowledge domain in a hierarchical fashion. An IS-IN is a relationship, where one class A is included in another class B. A containment hierarchy is a direct extrapolation of the nested hierarchy concept. All of the ordered sets are still nested, but every set must be unique—no two sets can be identical. A generalized nested hierarchy allows multiple objects to be placed within the levels, but each object should have only one parent at each level. Containment hierarchy 200 is an exemplary data tree structure representing the actual path to a physical file collated on the file storage system. Universe 205 is the root node of the file storage system. The file storage system is represented with system 210. Containment hierarchy 200 includes the same concepts and physical files as conceptual hierarchy 100, but the relationships among the concept represent the difference in the containment hierarchy. File 110, person 115, computer 120, and company 125 are organized via IS-IN relationship with the root node system 210. The containment hierarchy 200 may be implemented as a file system with nested folders. For example, system 210 includes file 110 concept, which includes (#UID)_CV_XYZ.pdf 130 concept that is associated with CV_XYZ.pdf 135 physical file via a concept attribute with a URL as a key and the file path as a value.

Figure 3A:
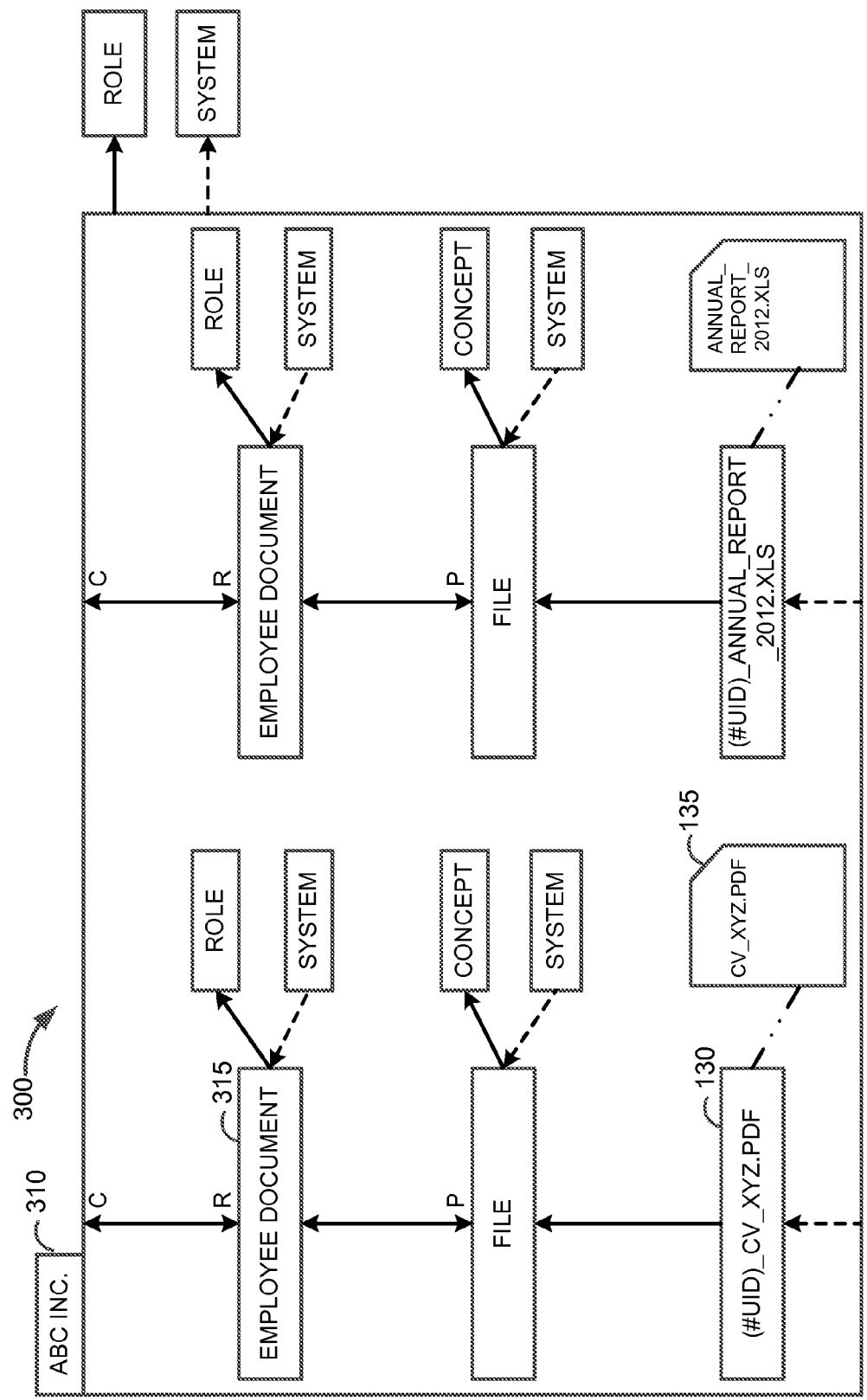
FIG. 3A is a block diagram illustrating an exemplary file role relationship, according to an embodiment.

FIG. 3A is a block diagram illustrating an exemplary file role relationship, according to an embodiment. File role relationship 300 specifies the role a concept plays on another concept. ABC Inc. 310 is a company defined as a concept. File 110 concept plays the role of employee document 315 in the conceptual world of concept ABC Inc. 310. Instances of a file role relationship may be defined. For example, (#UID)_CV_XYZ.pdf 130 concept is associated with file 110 and thus, (#UID)_CV_XYZ.pdf 130 plays the role of employee document 315 in ABC Inc. 310 concept. In various embodiments, the concepts participating in role relationships and role instance relationships have to be directly or indirectly present as child concepts in the underlying containment hierarchy. In the containment hierarchy, a container concept is the root concept of the hierarchy, or imported into the world of the container concept, for which the roles and role instances are created.

Figure 3B:
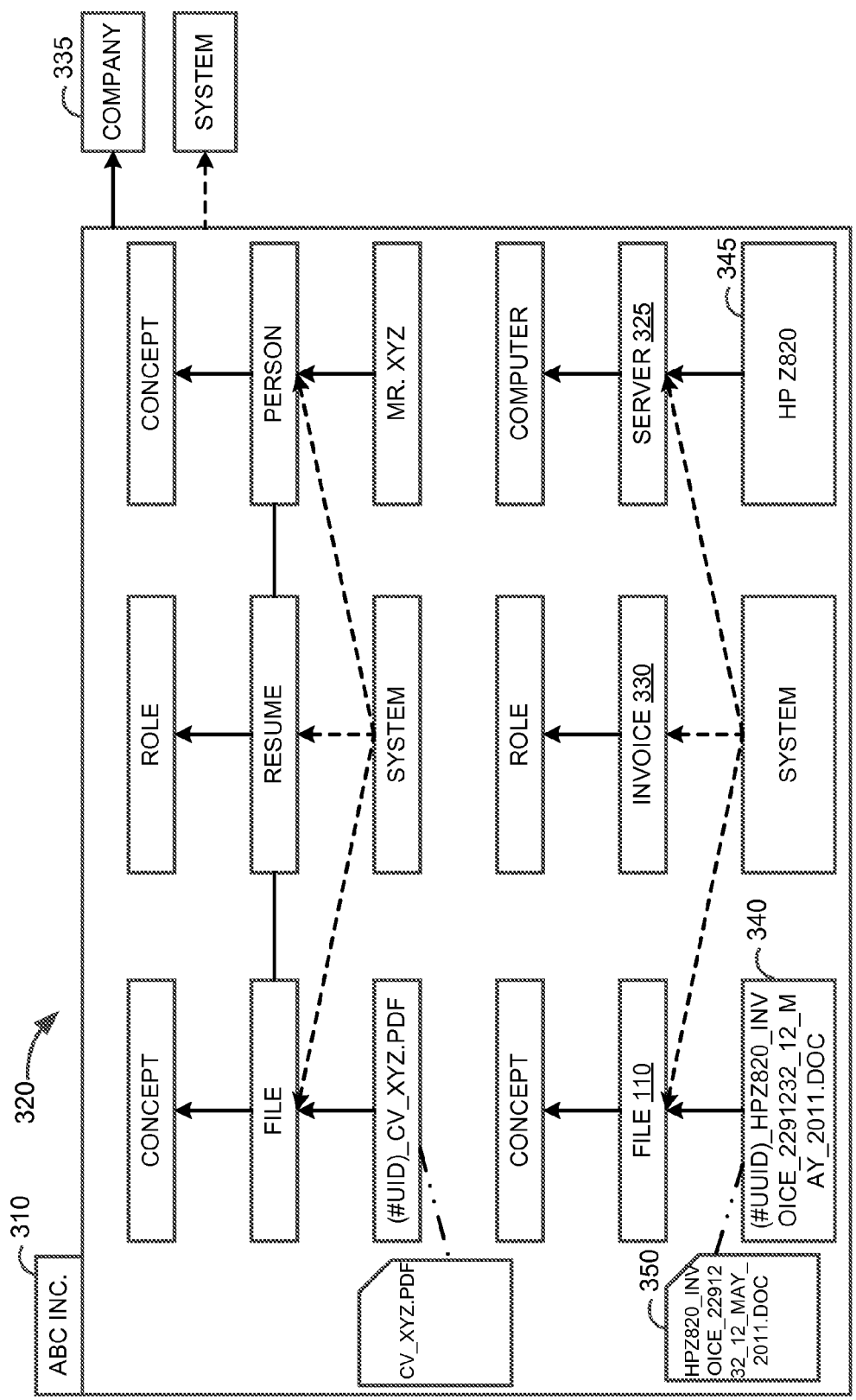
FIG. 3B is a block diagram illustrating an exemplary file association relationship, according to an embodiment.

FIG. 3B is a block diagram illustrating an exemplary file association relationship, according to an embodiment. File association 320 specifies the association a source concept has with a target concept. The association is defined as a role in the conceptual world of a given concept. For example, file 110 concept is a source concept that is associated with target concept server 325 in company 335 concept of ABC Inc. 310 concept. Further, (#UUID)_HPZ820_Invoice_2291232_12_May_2011.doc 340 concept is associated with HP Z820 345 as invoice 330. This means that HPZ820_Invoice_2291232_12_May_2011.doc 350 is the actual invoice file for HP Z820 345 server in company ABC Inc. 310. In various embodiments, all the concepts participating in an association or association instance have to be directly or indirectly present as child concepts in the underlying containment hierarchy. In the containment hierarchy, a container concept is the root concept of the hierarchy, or imported into the world of the container concept, for which the associations and association instances are created.

Figure 4:
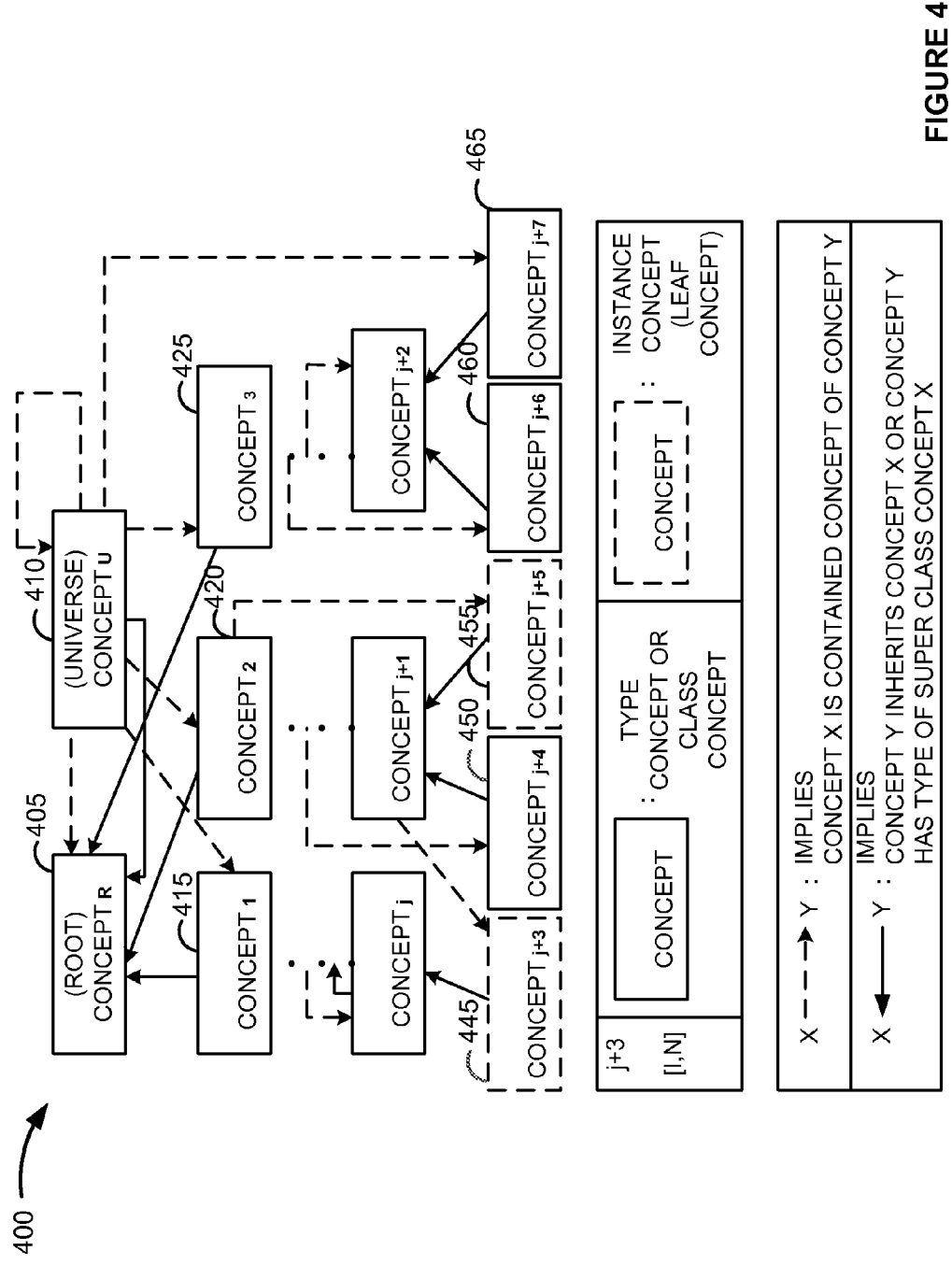
FIG. 4 is a block diagram illustrating a conceptual framework, according to an embodiment.

FIG. 4 is a block diagram illustrating a conceptual framework, according to an embodiment. In various embodiments, the conceptual framework 400 is based on a conceptual hierarchy, a containment hierarchy, and concept relationships. In various embodiments, an entity in the conceptual framework inherits a specific concept in the conceptual framework and in the same time may be nested inside a specific concept in the containment hierarchy. The two hierarchies have some default concepts in place generated by an operating system administrator and/or a database administrator beforehand, thereby creating the roots of the two hierarchies. In various embodiments, conceptual framework 400 includes a plurality of concepts (at least two). Concept$_R$ 405 is the root concept of the conceptual hierarchy of the conceptual framework. It represents an object of type "root concept". Concept$_U$ 410 is at the same level as concept$_R$ 405. Concept$_U$ 410 represents the root of the containment hierarchy of the conceptual framework. Concept$_U$ 410 is a container concept of concept$_R$ 405.

The next level of the hierarchy of the conceptual framework includes concept$_1$ 415, concept$_2$ 420, and concept$_3$ 425. They represent objects that may be of type "concept" or class "concept". These concepts inherit concept$_R$ 405 or have type of super class concept. Concept$_U$ 410 is a container concept of concept$_1$ 415, concept$_2$ 420, and concept$_3$ 425. The bottom level of the hierarchy of the conceptual framework 400 includes instance concept$_{J+3}$ 445, concept$_{J+4}$ 450, instance concept$_{J+5}$ 455, concept$_{J+6}$ 460, and concept$_{J+7}$ 465. All concepts in the conceptual framework 400 are semantically inherited and nested, thus forming a logical connection. The conceptual framework 400 enables a particular concept, located at any level, to be queried efficiently by its parent concept or forefather concepts. In this way, it is possible to drill down the hierarchy to the specific concept searched for as given in the query. Similarly, the containment hierarchy of the conceptual framework 400 can be used to get the nested/hierarchical relationship between the container concept and the subsumed concept.

Figure 5:
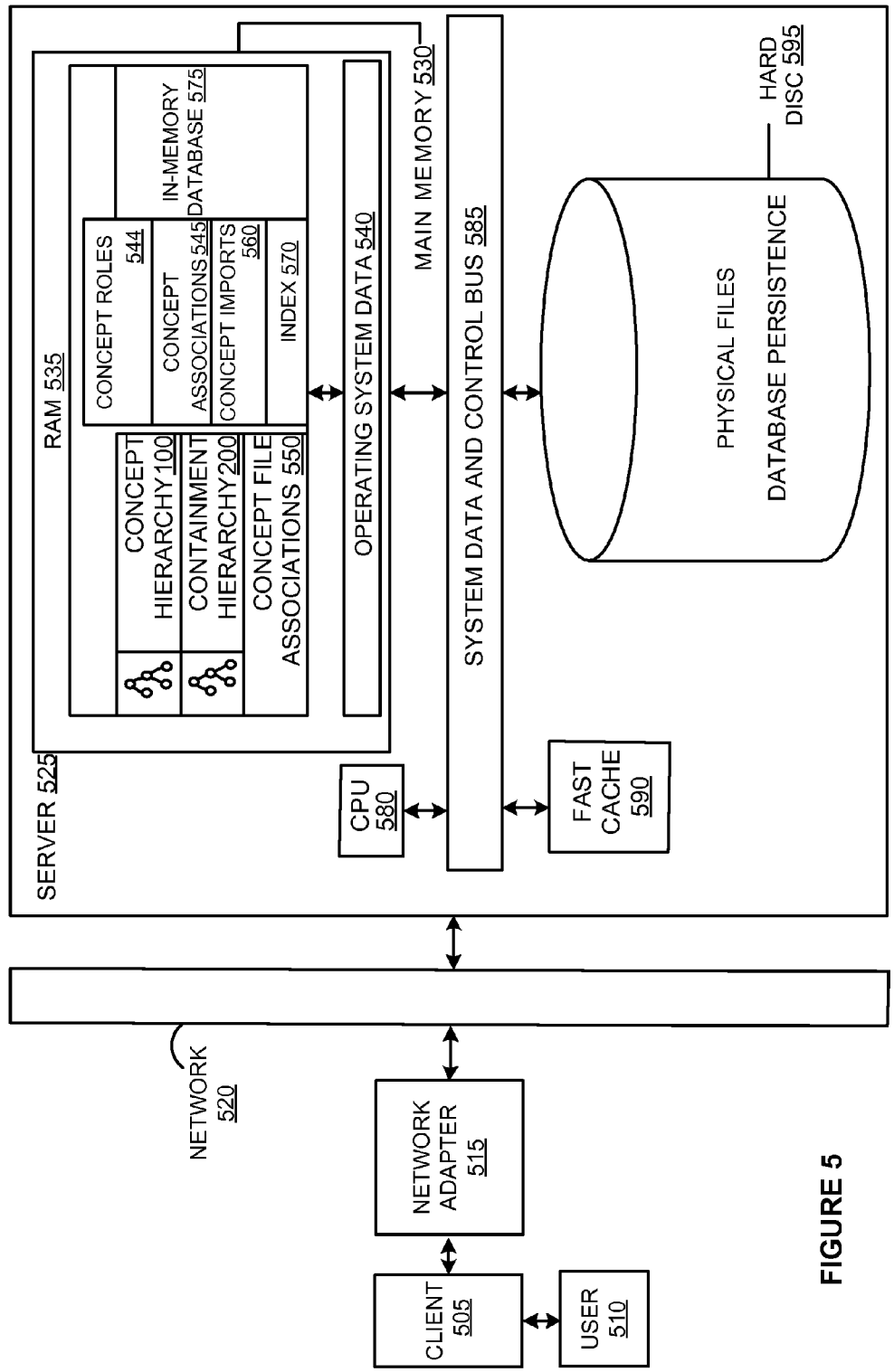
FIG. 5 is a block diagram illustrating an architectural view of a system including the conceptual framework, according to an embodiment.

FIG. 5 is a block diagram illustrating an architectural view of a system including the conceptual framework, according to an embodiment. In an embodiment, a user 510 of a client system 505 is connected to a server 525 via a network adapter 515 and network 520. It should be noted that there may be multiple clients connected to server 525. Server 525 includes at least a main memory 530, a processor 580, a system data and control bus 585, fast cache 590, and hard disk 595. Fast cache 590 may be used to improve the performance of server 525. The system data and control bus 585 provides instructions from the processor 580 to RAM 535, the fast cache 590, and the hard disk 595. The main memory 530 includes RAM 535 and operating system data 540. The RAM includes conceptual framework data within in-memory database 575. Further, the conceptual framework data 542 includes at least concept hierarchy 100, containment hierarchy 200, concept file associations 550, concept roles 544, concept associations 545, concept imports 560, and index 570. The conceptual framework data 542 is stored in the RAM 535, while the physical files (such as cv_xyz.pdf 135, annual_report_2012, (#UUID)_HPZ820_INVOICE_2291232_12_MAY_2011.DOC 340, etc.) associated with the concepts of the conceptual framework 400 are stored in the hard disk 595. The physical files may be used for backup operations.

Figure 6A:
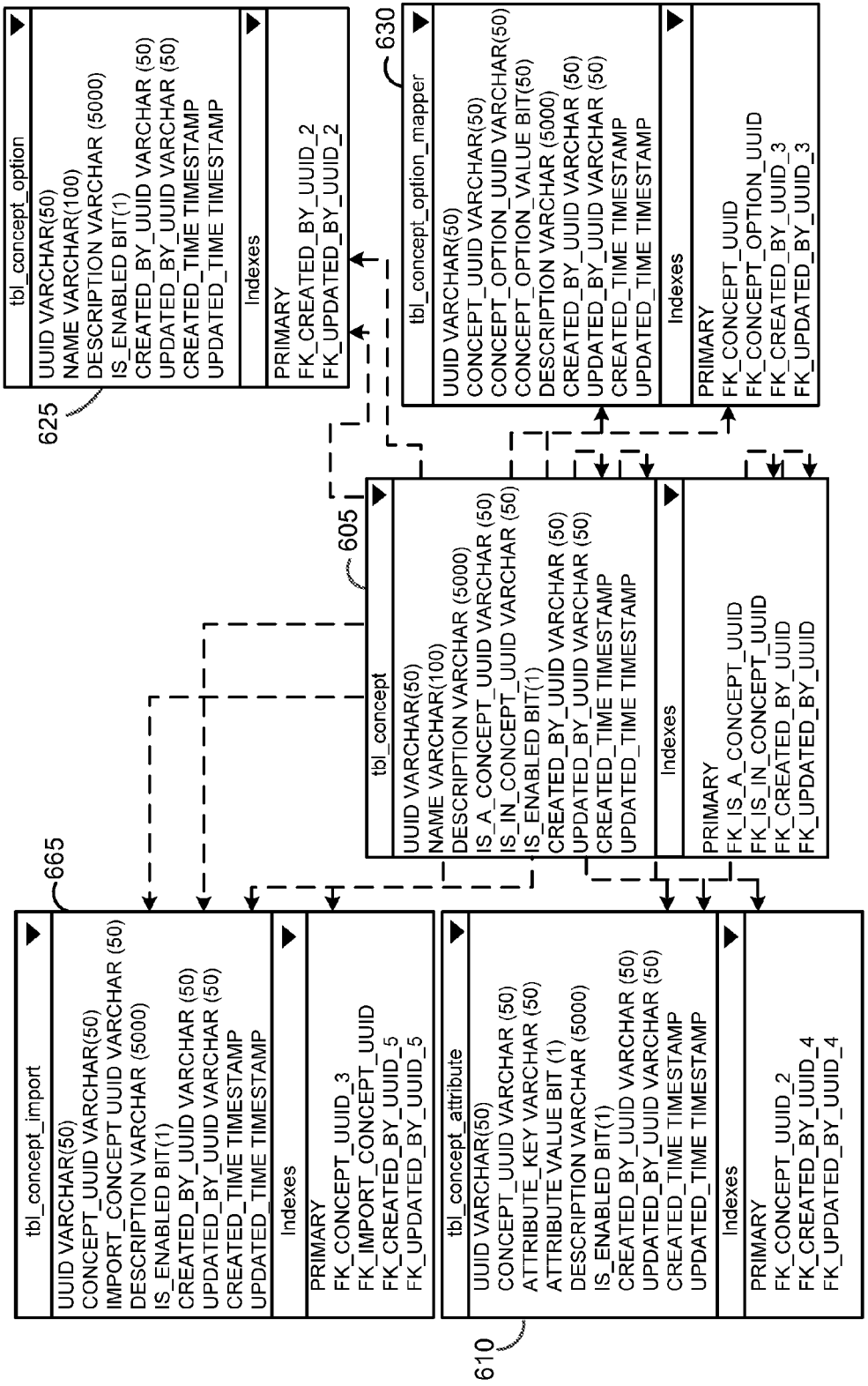
FIGS. 6A, 6B, and 6C are block diagrams illustrating the conceptual framework data model, according to an embodiment.
Figure 6B:
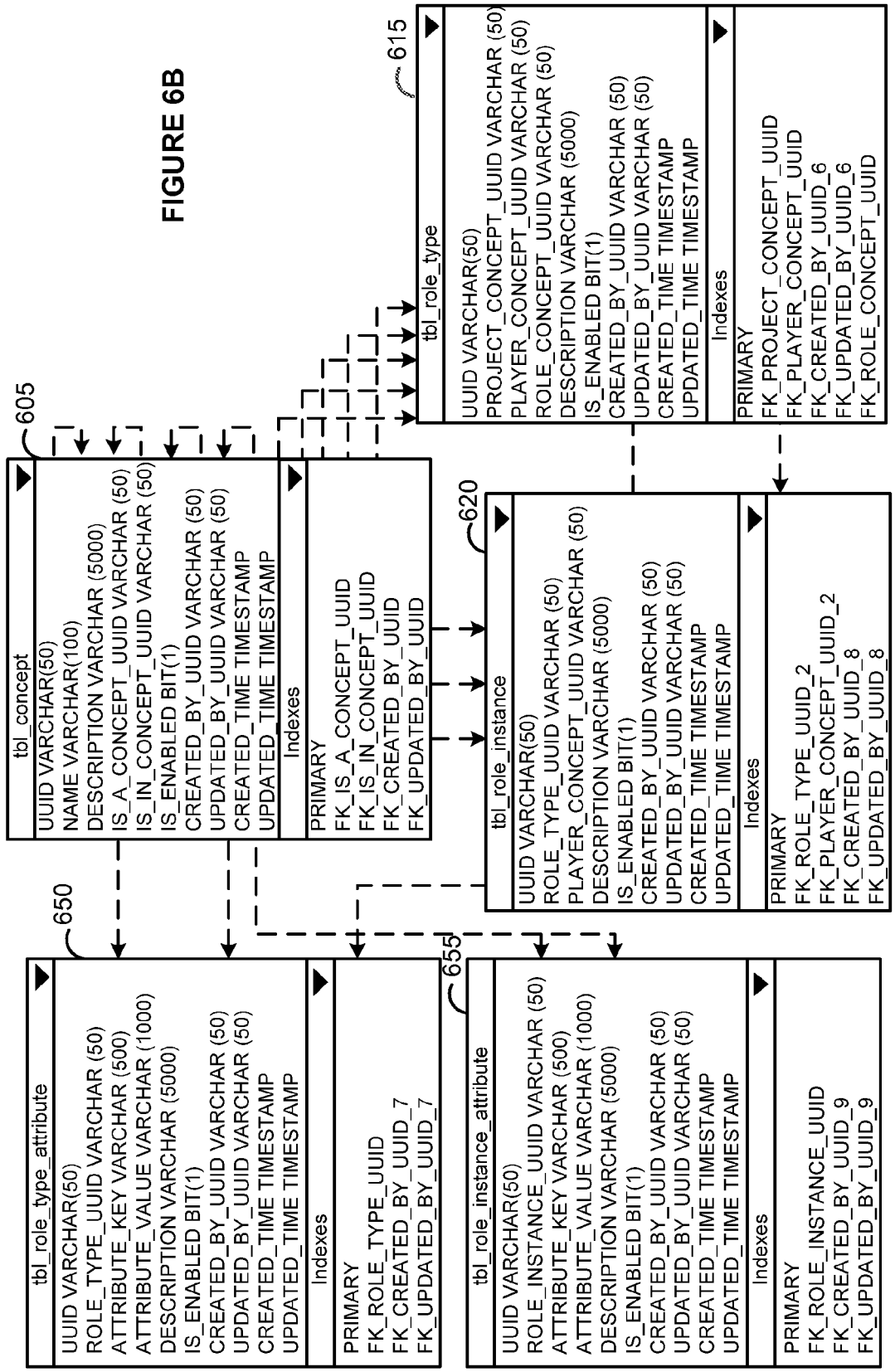
Figure 6C:
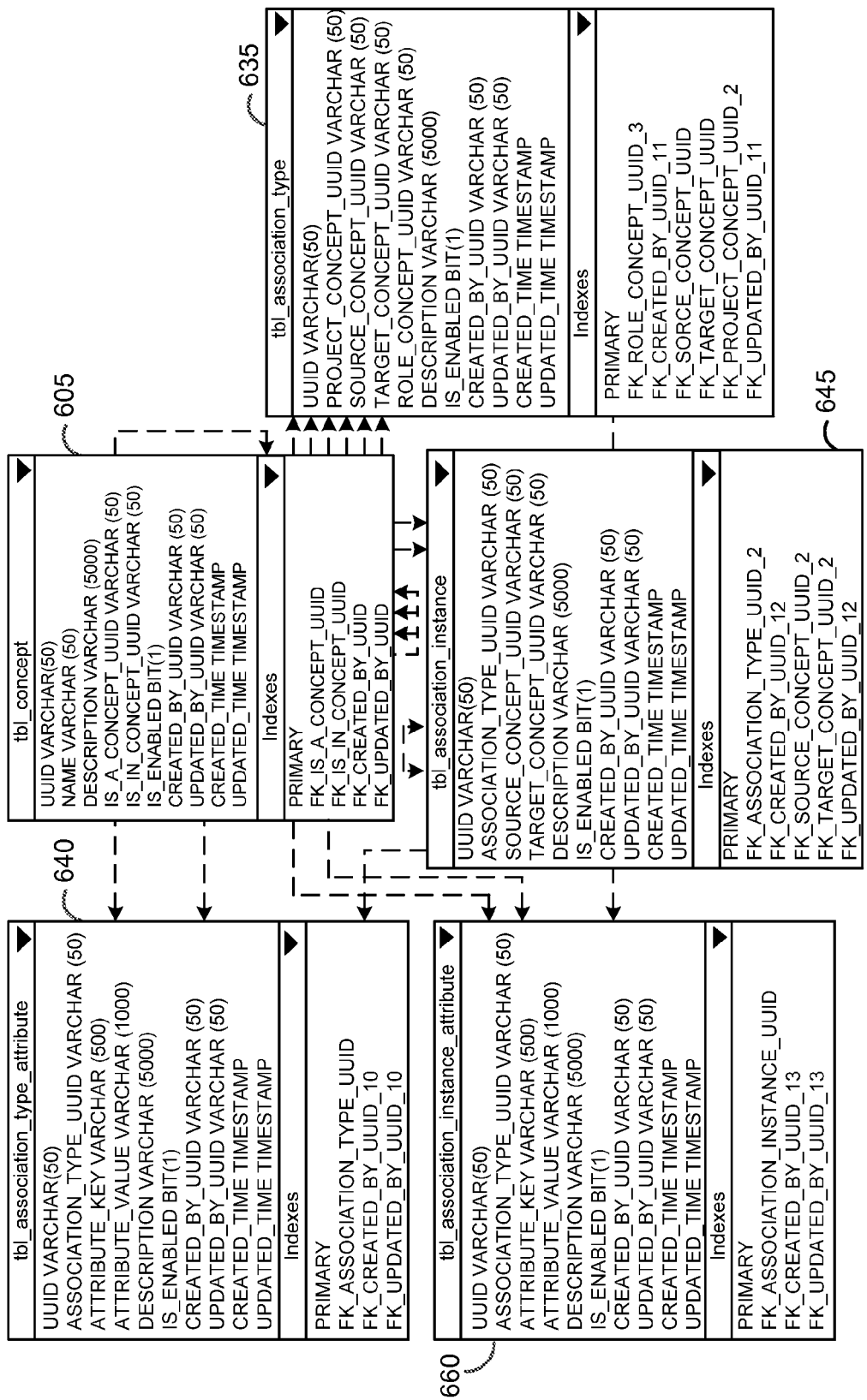

FIGS. 6A, 6B, and 6C are block diagrams illustrating the conceptual framework data model, according to an embodiment. In various embodiments, the conceptual framework data model is a relational in-memory database model used to model objects in a system, create corresponding concepts for the objects and relationships within the objects, and thus creating a hierarchy. Every concept has a set of attributes having a key-value pair defined by the creator of the concept. Each concept may have a set of user-defined attributes and a set of default attributes. A user can query an object based on the keys and values of these attributes and can also use them to trigger a more comprehensive query. Relationships between two different concepts within a particular container concept can be established optionally to form a binary relationship between the concepts within the container concept.

Further, a role concept defines the role played by the target concept on the source concept thereby giving relationship predicate. For example, "John owns a car" statement has a concept "John" and a concept "car", where "owns" is a role played by "John" on "car". In this example, the role is also modeled as a concept. The relationship also has a set of attributes that are both default and user-defined and is of the form of key-value pairs. An instance of the relationship may be defined. The purpose of having the conceptual and the containment hierarchy as part of the conceptual framework is to associate a semantic meaning to each and every file and folder in an existing hierarchical file storage system. In the process of modeling the conceptual framework, two concepts can have the same name, but each of them must have a different meaning in a different context. For example, "Java" is a programming language as well as an island in Indonesia. Both the "Java" concepts have their own conceptual and containment parent to define whether the one queried is the programming language or the island. An important rule is that no two or more concepts can have same conceptual and containment hierarchy. This rule should be followed while adding a new concept or updating an existing concept in the conceptual framework.

Table 605 represents a data model element that is used to create a concept in the conceptual framework 400. A concept can be defined with characteristics such as a unique identifier (UUID), a name, a description, and so on. Further, a concept can be defined as a parent concept of a hierarchy with its ID (e.g., "is_a_concept_uuid") and also to which parent concept the current concept belongs by specifying the ID of the parent concept (e.g., "is_in_concept_uuid"). In addition, the user creating or updating the concept can be defined by a user's ID. The time the concept is created and the time it was updated can also be defined by timestamps. One of the attributes for a concept, from the set of default attributes, is "is_enabled", a Boolean attribute that specifies whether a concept is enabled. Similarly, each concept, file, relationship type, and relationship instance has a set of default and user-defined attributes.

Table 610 represents a data model element that is used to create an attribute for an object of type "concept" in the conceptual framework 400. The attribute may include: a unique ID of the attribute; the ID of the concept for which the attribute is modeled; a description; key-value information; the user creating or updating the attribute; the time the attribute is created or updated by providing timestamps. Also, the attribute may be modeled to specify if it is enabled or not by the "is_enabled" property.

Table 615 represents a data model element that is used to define the role type between two different concepts. For example, a role relationship between a student and a professor can be defined, where "student" and "professor" are both defined as concepts. In this relationship the professor plays the role of a teacher. The role type between two concepts may be defined with: a unique ID; the ID of the player concept that plays the role; the ID of the role concept (a role concept defines the role type); the ID of the context of the role specified by the "project_uuid" property. The context of the role may also be defined as a concept. Other information may also be included such as a description; the user creating or updating the relationship; the time the relationship is created or updated by providing timestamps. Also, the role type may be modeled to specify if it is enabled or not by the "is_enabled" property. Once the role type is defined, role type attributes can be defined using table 650 of FIG. 6B.

Once the role type is defined, a role instance of that type is created. Table 620 represents a data model element that is used to define a role instance. The role instance may include: a unique ID; the ID of the player concept; the ID of the role type defined via table 615. Other information may also be included such as a description; the user creating or updating the relationship instance; the time the relationship instance is created or updated by providing timestamps. Also, the role instance may be modeled to specify if it is enabled or not by the "is_enabled" property. Once the role instance is defined, role instance attributes can be defined using table 655.

In this way every object in a file system can be modeled as a concept and defined as a role concept in a hierarchy. Further, two or more concepts can be related with each other by specifying relationship types, associations, descriptions, and so on. Table 625 represents a data model element that is used to define concept options. The options that can be defined for a concept include: a unique ID of the option; name of the option; ID of the concept; a description; the user creating or updating the attribute; the time the attribute is created or updated by providing timestamps. Also, the option may specify if it is enabled or not by the "is_enabled" property.

Table 630 of FIG. 6A represents a data model element that is used to define concept option mapper. A concept option mapper describes the mapping between the option and the concept. The concept option mapper can be defined with a unique ID, the ID of the concept, the ID of the concept option, a value of the concept option; a description. Further, the user can specify the time the file was last modified, last accessed, the time the file was created, its size, and so on. Once the mapping between the option and the concept is performed, a complex query on the physical file is possible using the information specified for the file as search criteria.

Table 635 represents a data model element that is used to define an association type between two different concepts. The association type between a source concept and a target concept may be defined with: a unique ID; the ID of the source concept; the ID of the target concept; the ID of the role concept. Other information may also be included such as a description; the user creating or updating the association; the time the relationship is created or updated by providing timestamps. Also, the association type may be modeled to specify if it is enabled or not by the "is_enabled" property. Once the association type is defined, association type attributes can be defined using table 640.

Once the association is defined, an association instance of that type is created. Table 645 represents a data model element that is used to define an association instance. The association instance may include: a unique ID; the ID of the source concept; the ID of the target concept; the ID of the association type defined via table 635. Other information may also be included such as a description; the user creating or updating the association instance; the time the association instance is created or updated by providing timestamps. Also, the association instance may be modeled to specify if it is enabled or not by the "is_enabled" property. Once the association instance is defined, association instance attributes can be defined using table 660.

Table 665 represents a data model element that is used to import concepts into the conceptual framework. The imported concept may be defined with: a unique ID; the ID of the concept; the ID of the container concept that will accommodate the imported concept; the ID of the imported concept. Other information may also be included such as a description; the user creating or updating the imported concept; the time the imported concept is created or updated by providing timestamps. Also, the imported concept may be modeled to specify if it is enabled or not by the "is_enabled" property.

In the conceptual framework, the data model is created in an in-memory database that uses shared memory to store the concepts and the physical file(s) associated with a particular concept. Alternatively, the files can be stored on hard disks and a pointer to the files can be stored in the in-memory database instead of the actual files. In various embodiments, the users may be provided with an application layer and via some application programming interfaces (APIs) to create and extend the conceptual framework. The repository containing the conceptual framework (the database tables and other schema metadata) created in the in-memory database can be implemented by a distributed database physically located on a number of networked remote computers in one or more locations. In this scenario, each of the remote computers has its respective memory space that is devoted to implementing the conceptual framework and the distributed in-memory database provides location transparency, fragmentation transparency, and replication transparency.

Figure 7:
FIG. 7 illustrates an exemplary table of concepts, according to an embodiment.

FIG. 7 illustrates an exemplary table of concepts, according to an embodiment. Table 700 represents a database table that stores created concepts according to the concepts 605 data model element. Table 700 includes basic concepts such as "person", "user", "administrator" and specific concepts such as "Jai Ho", "Slumdog Millioner", and so on. Each concept is stored with unique ID, description, the ID of the parent concept, the ID of the top-level concept (specifying at which level the concept is located in the hierarchy), options, and if there are any files associated with the concept. For example, "Jai Ho" concept has ID=10 and a description that this is a song from the movie "Slumdog Millioner". The ID of the parent concept of the "Jai Ho" concept is 9, this is "Song" and the ID of the top-level concept is 13, which means that "Jai Ho" is positioned under "Slumdog Millioner" in the hierarchy of the conceptual framework.

Figure 8A:
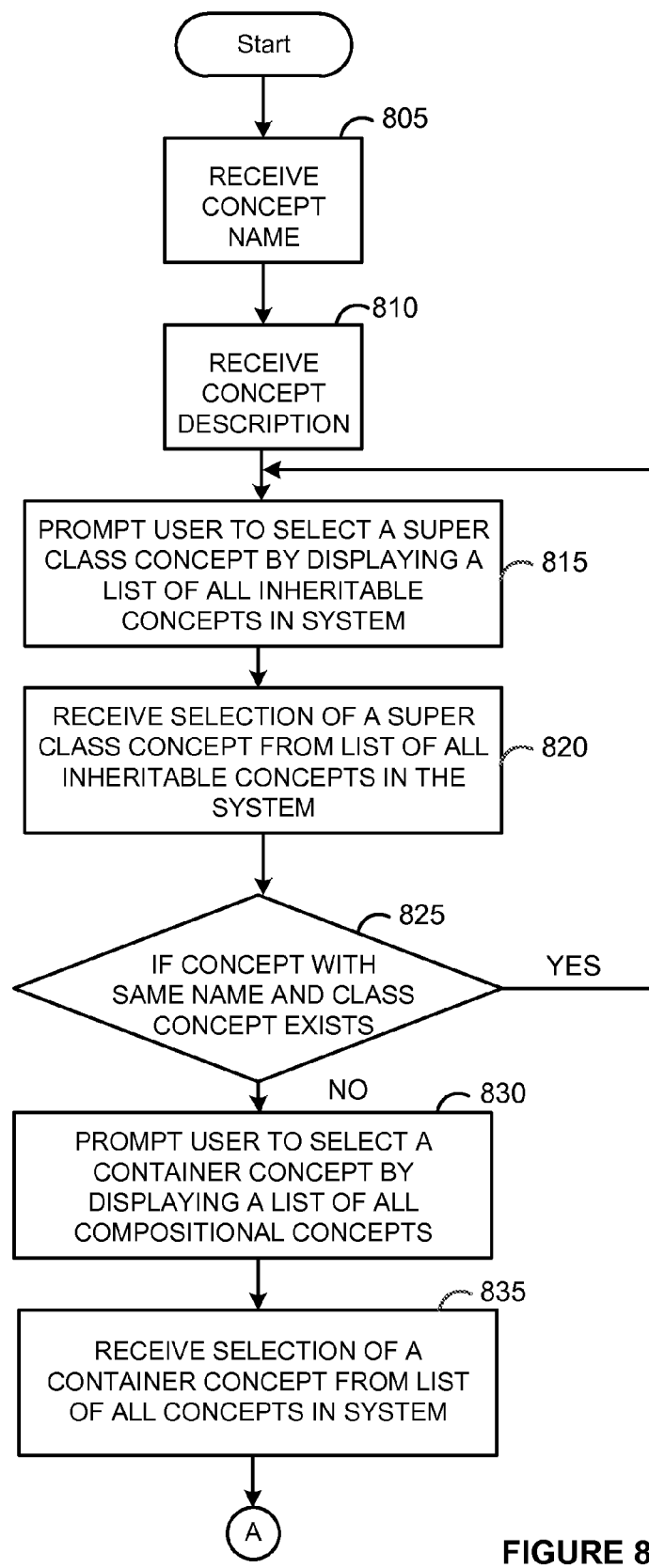
FIGS. 8A and 8B are flow diagrams illustrating a process of creating a concept, according to an embodiment.
Figure 8B:
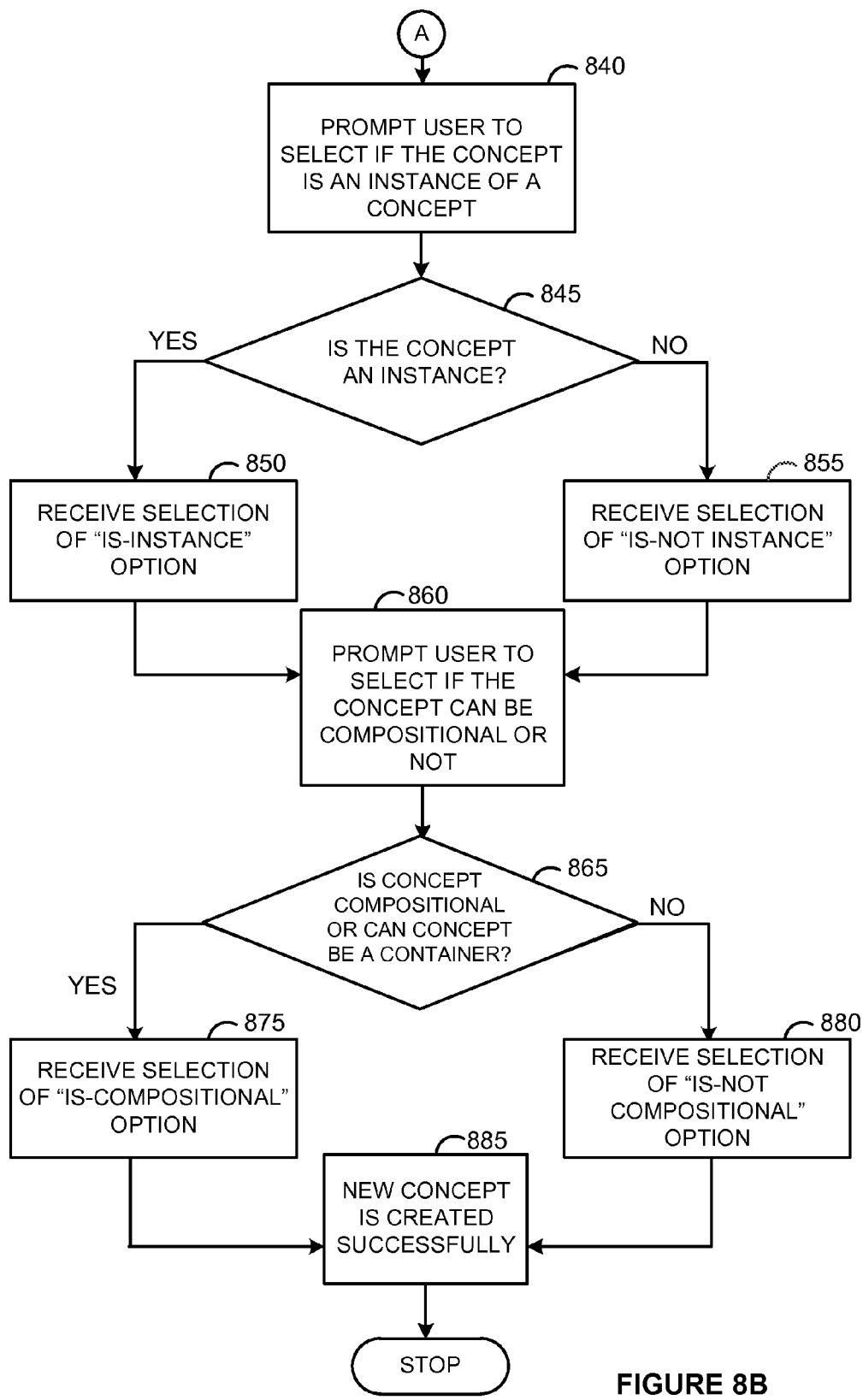

FIGS. 8A and 8B are flow diagrams illustrating a process of creating a concept, according to an embodiment. In various embodiments, the conceptual framework is built on concepts and concept relationships organized in conceptual hierarchies and containment hierarchies. File storage systems are matched against the conceptual hierarchies and the containment hierarchies and physical files are associated with one or more concepts. In various embodiments, the physical files are stored in the main memory. The main memory is enhanced with an in-memory database engine that enables fast system performance when processing complex multivariate queries. The process of building the conceptual framework starts with creating concepts. In some embodiments, an application is provided for creating concepts. At block 805, a concept name is received via the application interface. At block 810, a description for the concept is received. Then, the user is prompt to select a super class concept (a root concept) by displaying in a UI of the application a list of all inheritable concepts, at block 815. At block 820, a selection of a super class concept is received. At block 825, it is checked if there already is a concept with the same name and the same super class concept. If the result of the detection is positive, the process is returned to block 815, where the user can select a different super class concept.

If the result of the detection is negative, the process continues at block 830. At block 830, the user is prompted to select a container concept by displaying a list of all compositional concepts in the system. At block 835, a selection of a container concept is received. At block 840, the user is prompted to select if the concept the user is creating is an instance of a concept. At block 845, a decision is performed. If the concept is an instance concept, the process continues at block 850, otherwise at block 855. At block 850, a selection of an instance concept option is received. At block 855, a selection of a non-instance concept option is received. Both options continue at block 860.

At block 860, the user is prompted to select if the concept can be compositional. This means that the concept can be a container concept. At block 865, a decision is performed. If the concept is a compositional concept, the process continues at block 875, otherwise at block 880. At block 875, a selection of "is-compositional" option is received. At block 880, a selection of "is-not compositional" option is received. Both options continue at block 885. At block 885, the new concept is created successfully in the conceptual framework. In various embodiments, already existing concepts can be imported into the conceptual framework. If a concept is not present in the containment hierarchy of the conceptual framework, it can be imported into a currently selected concept from the user.

Figure 9:
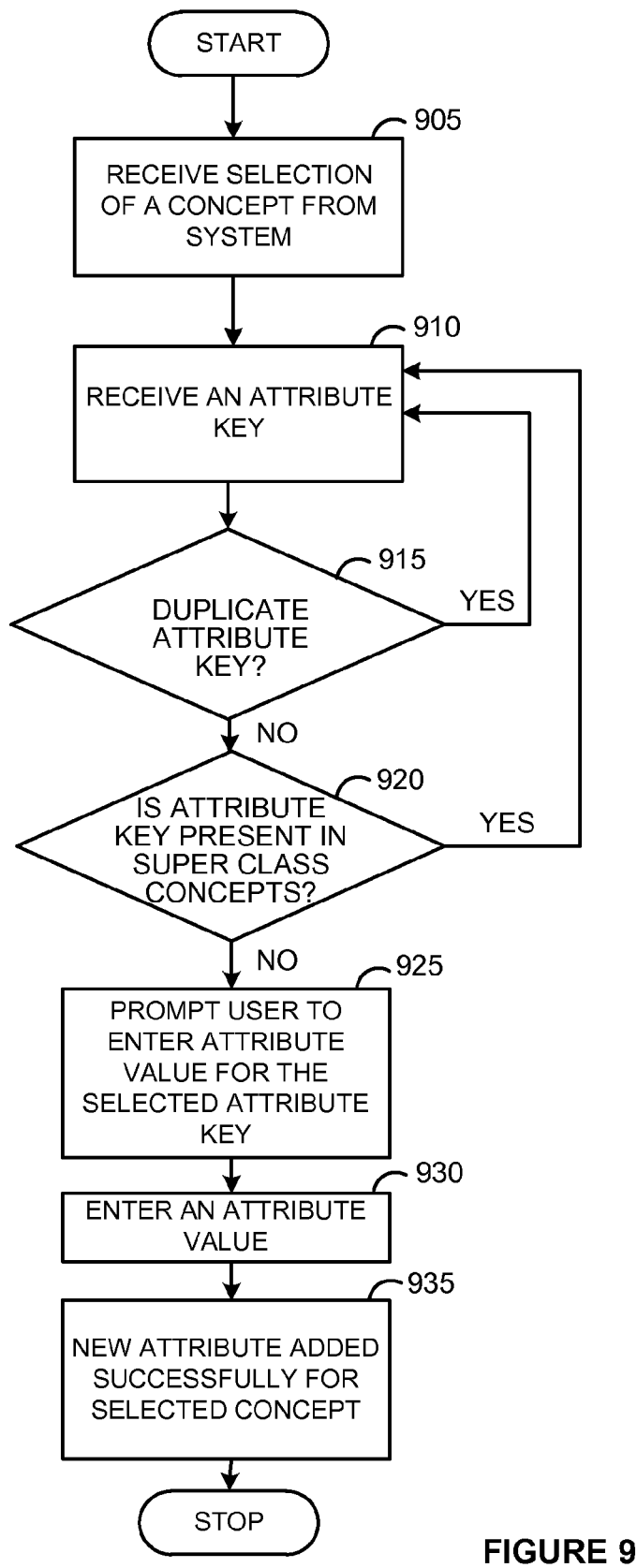
FIG. 9 is a flow diagram illustrating a process of adding a concept attribute, according to an embodiment.

FIG. 9 is a flow diagram illustrating a process of adding a concept attribute, according to an embodiment. Once a concept is created, the user can add attributes to that concept. At block 905, a selection of a concept from one or more concepts is received. At block 910, a key of the attribute is entered by the user in the UI of the application and received at the conceptual framework. The attribute key is checked if it is a duplicate, at block 915. If the attribute key is a duplicate, the process is returned at block 910 for selection of another key. If the attribute key is unique, the process continues at block 920. At block 920, the attribute key is checked if it is present in the super class concepts of the current concept. If so, then the process is returned again at block 910. Otherwise, the process continues at block 925.

At block 925, the user is prompted to enter an attribute value for the selected attribute key. At block 930, the attribute value is received. Finally, at block, 935, the new attribute is added successfully for the currently selected concept. In various embodiments, the application for creating the conceptual framework enables a user to modify concept attributes by editing the attribute key or value (or both) and by deleting the attribute. It should be noted that if the concept attribute is inherited by other concepts, it may not be deleted. After the concept attribute is modified, the user confirms the change and the concept attribute is updated in the system.

Figure 10:
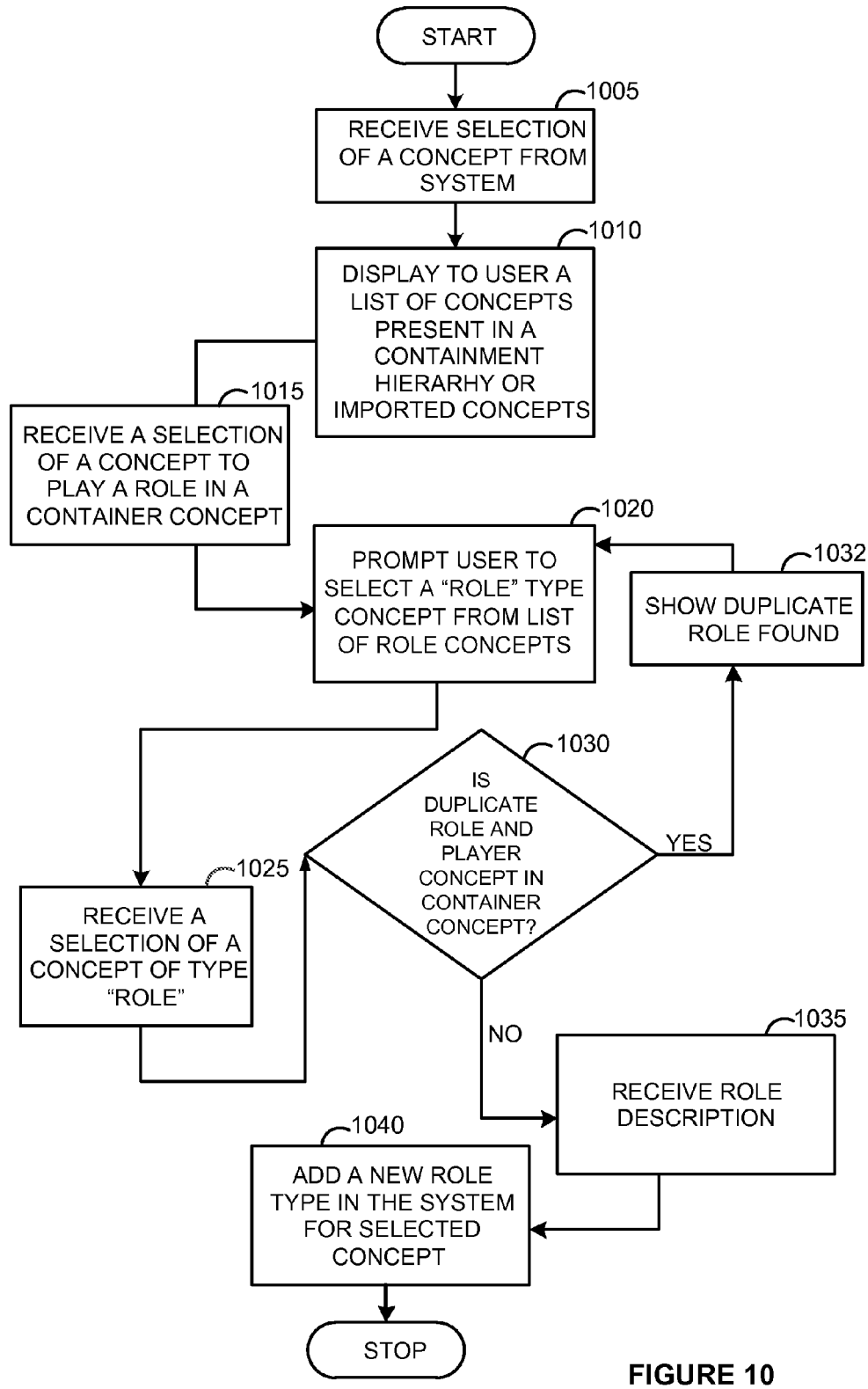
FIG. 10 is a flow diagram illustrating a process of adding a new role type for a concept, according to an embodiment.

FIG. 10 is a flow diagram illustrating a process of adding a new role type for a concept, according to an embodiment. At block 1005, a selection of a concept from one or more concepts is received. At block 1010, a list of concepts present in the containment hierarchy of the conceptual framework or imported concepts is displayed to the user. At block 1015, a selection of a concept to play a role in a container concept is received. Then, the user is prompted to select a role type concept from a list of role concepts, at block 1020. At block 1025, a selection of a role type concept is received. This is a concept of type: "role". At block 1030, it is checked if the role for the concept is a duplicate and if the player concept (e.g., the concept to play a role) is in the container concept. If so, the found duplicate role type concepts are displayed at 1032 and the user is back to select a different role type, at block 1020. Otherwise, the process continues at block 1035. At block 1035, a role description is entered and received. Then, the new role type concept is added for the selected concept, at block 1040. In addition, one or more attributes with key/value information can be added for a given role type concept.

Figure 11A:
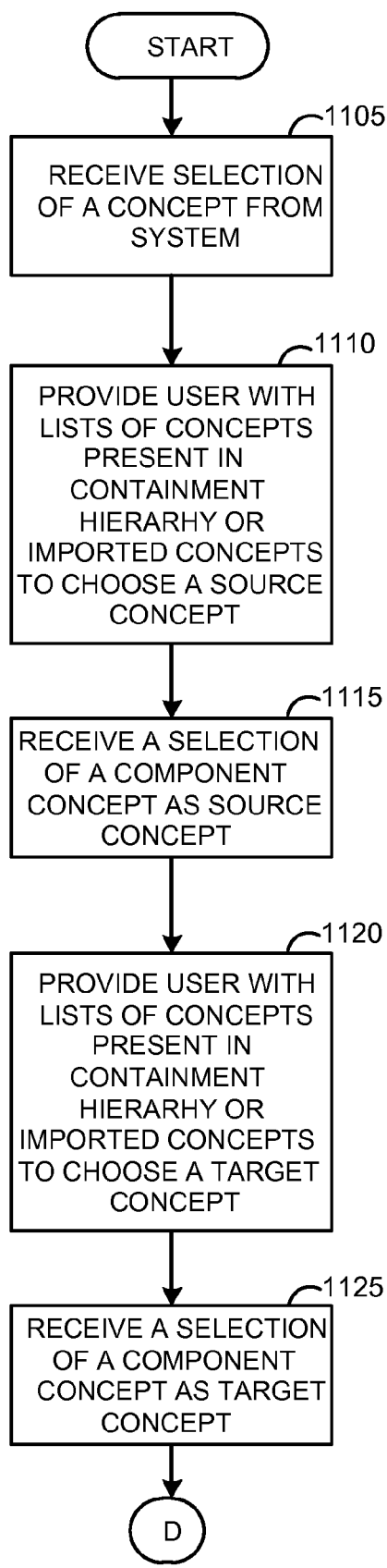
FIGS. 11A and 11B are flow diagrams illustrating a process of adding a new association type, according to an embodiment.
Figure 11B:
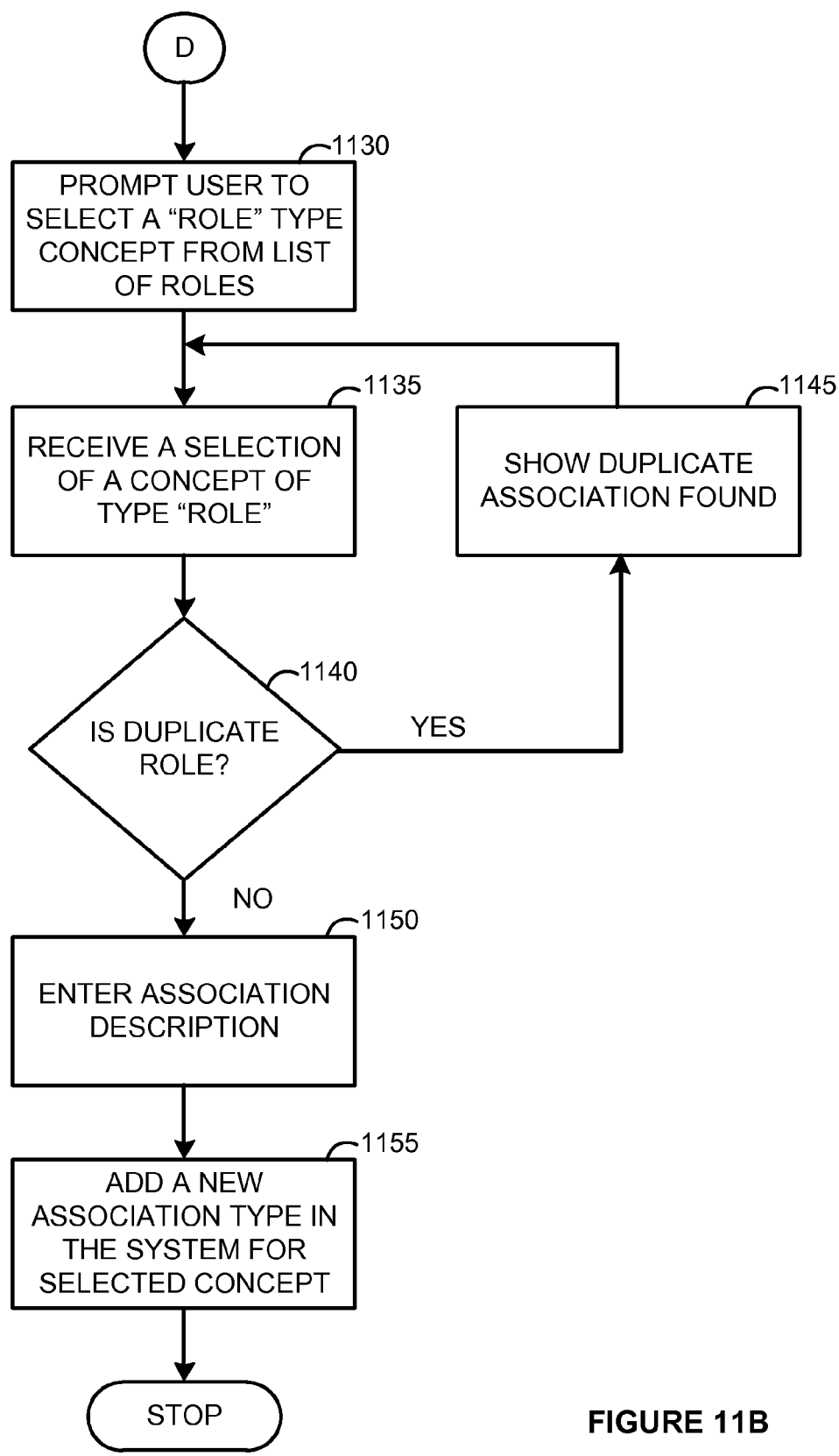

FIGS. 11A and 11B are flow diagrams illustrating a process of adding a new association type, according to an embodiment. The association represents a type of a relationship between two concepts—a source concept and a target concept in the conceptual framework. At block 1105, a selection of a concept from one or more concepts in the system is received. At block 1110, the user is provided with a list of concepts present in the containment hierarchy or with a list of imported concepts to choose a source concept. At block 1115, a selection of a first component concept as a source concept is received. Then, the user is provided with a list of concepts present in the containment hierarchy or with a list of imported concepts to choose a target concept, at block 1120. At block 1125, a selection of a second component concept as a target concept is received.

At block 1130, the user is prompted to select a role type concept from a list of role. The role type defines the relationship (the role) between the source concept and the target concept. At block 1135, a selection of a role type concept is received. This is a concept of type: "role". At block 1140, it is checked if the role for the concept is a duplicate. If so, the found duplicate association(s) is displayed at block 1145 and the user is back to select a different role type concept, at block 1135. Otherwise, the process continues at block 1150. At block 1050, a description for the association is entered and received. Then, the new association type is added for the selected concept, at block 1155. In addition, one or more attributes with key/value information can be added for a given association type concept.

Figure 12:
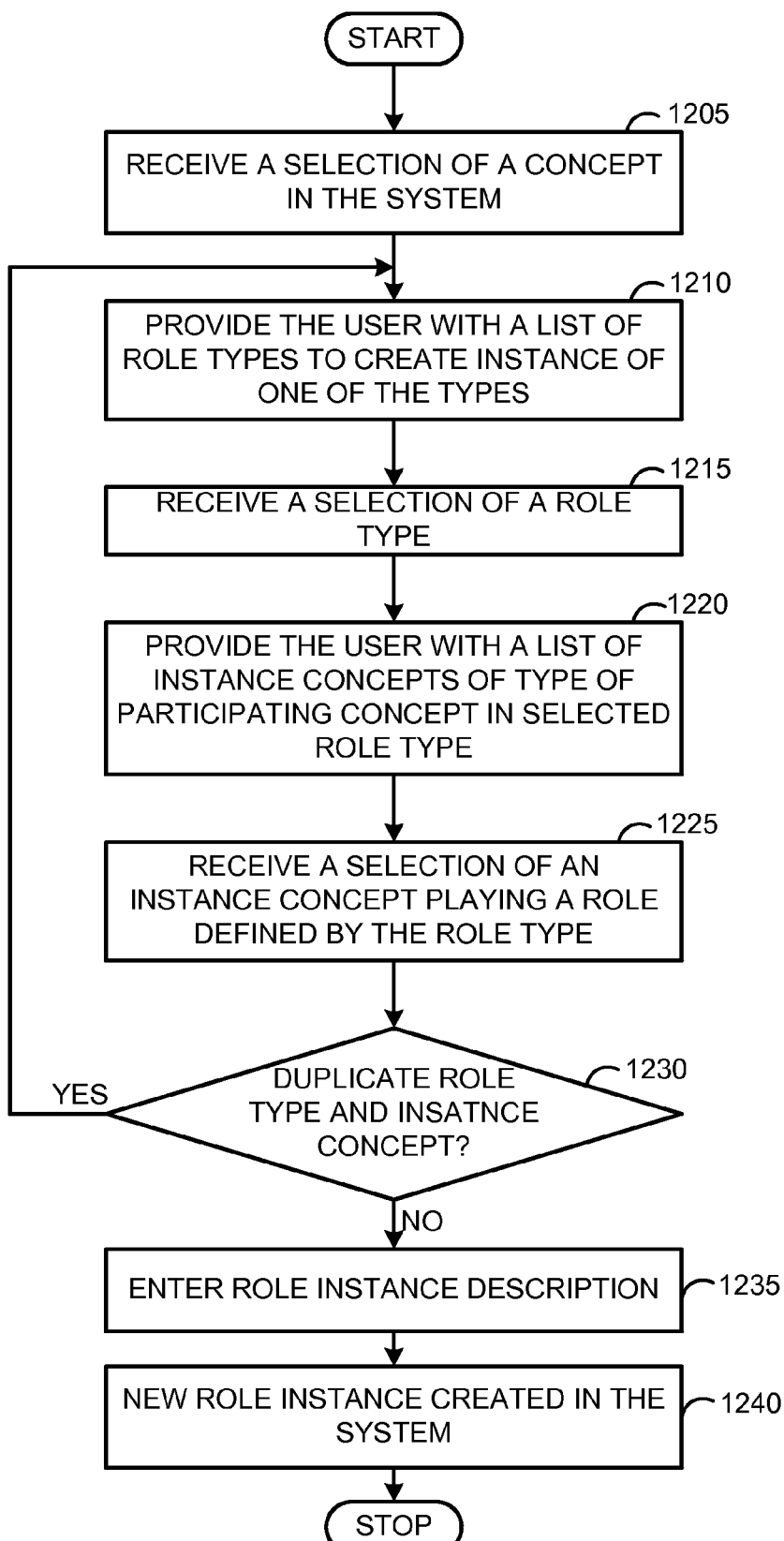
FIG. 12 is a flow diagram illustrating a process of adding a new role instance, according to an embodiment.

FIG. 12 is a flow diagram illustrating a process of adding a new role instance, according to an embodiment. At block 1205, a selection of a concept from one or more concepts in the system is received. At block 1210, the user is provided with a list of role types to create an instance of a role type from the list of role types. At block 1215, a selection of a role type is received. At block 1220, the user is provided with a list of instance concepts of type of participating concept in the selected role type. Then, at block 1225, a selection of an instance concept playing a role defined by the role type is received. At block 1230, it is checked if both, the role type and the instance concept, are duplicate. If so, the process is returned at block 1220, otherwise the process continues at block 1235. At block 1235, a role instance description is entered and received. Finally, at block 1240, the new role instance is created for the selected concept. In addition, one or more attributes with key/value information can be added for a given role instance.

Figure 13A:
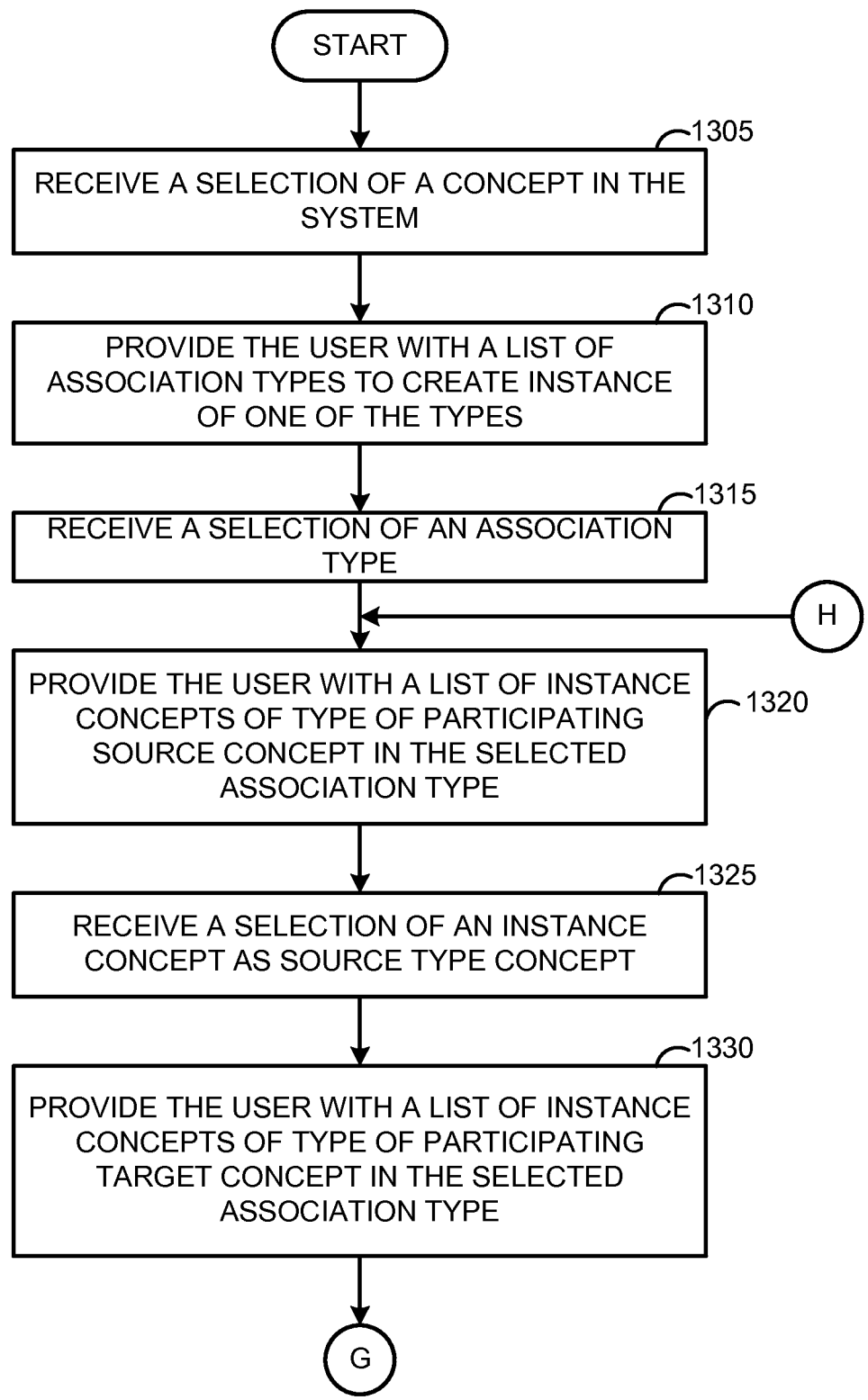
FIGS. 13A, 13B, and 13C are flow diagrams illustrating a process of adding a new association instance, according to an embodiment.
Figure 13B:
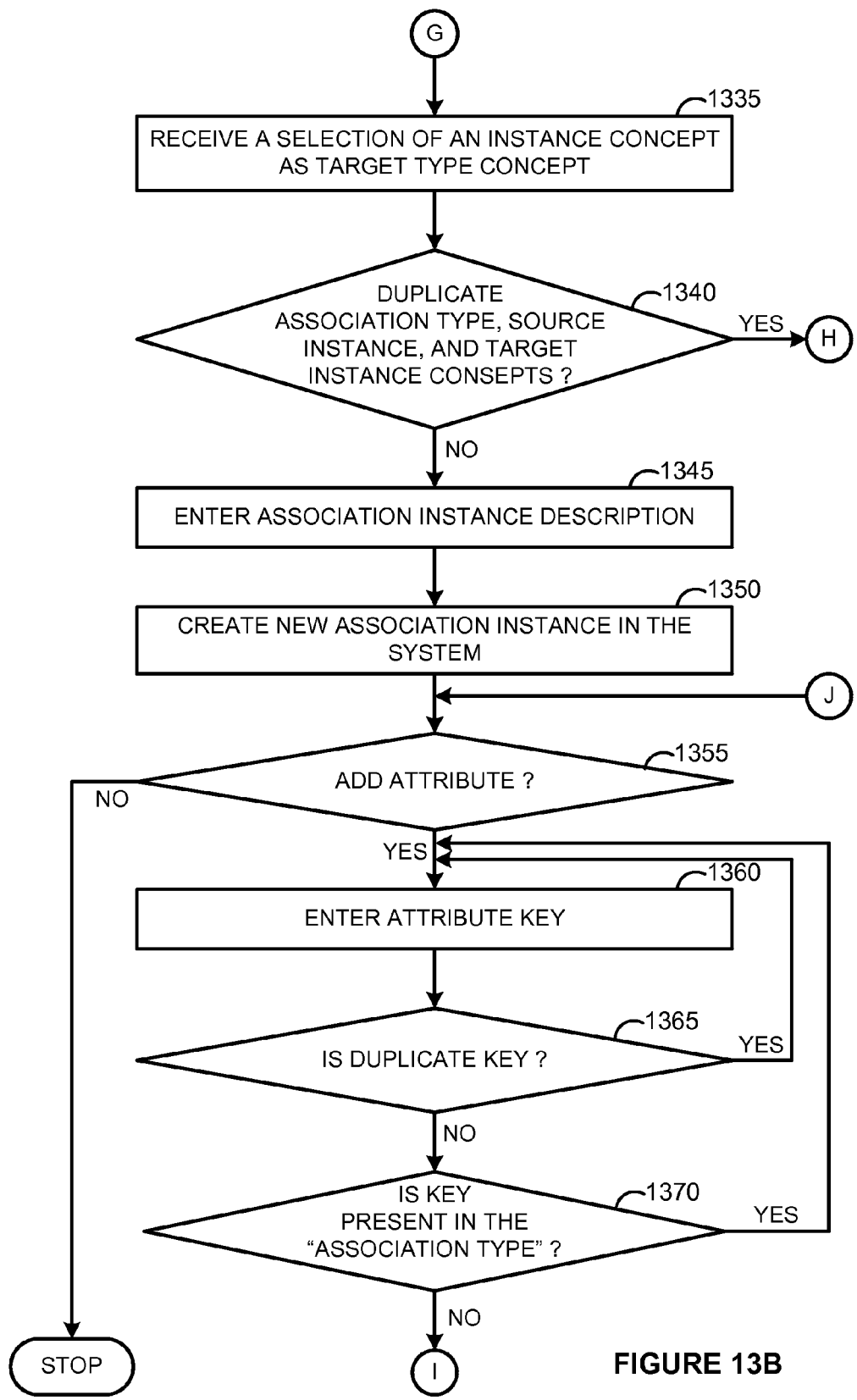
Figure 13C:
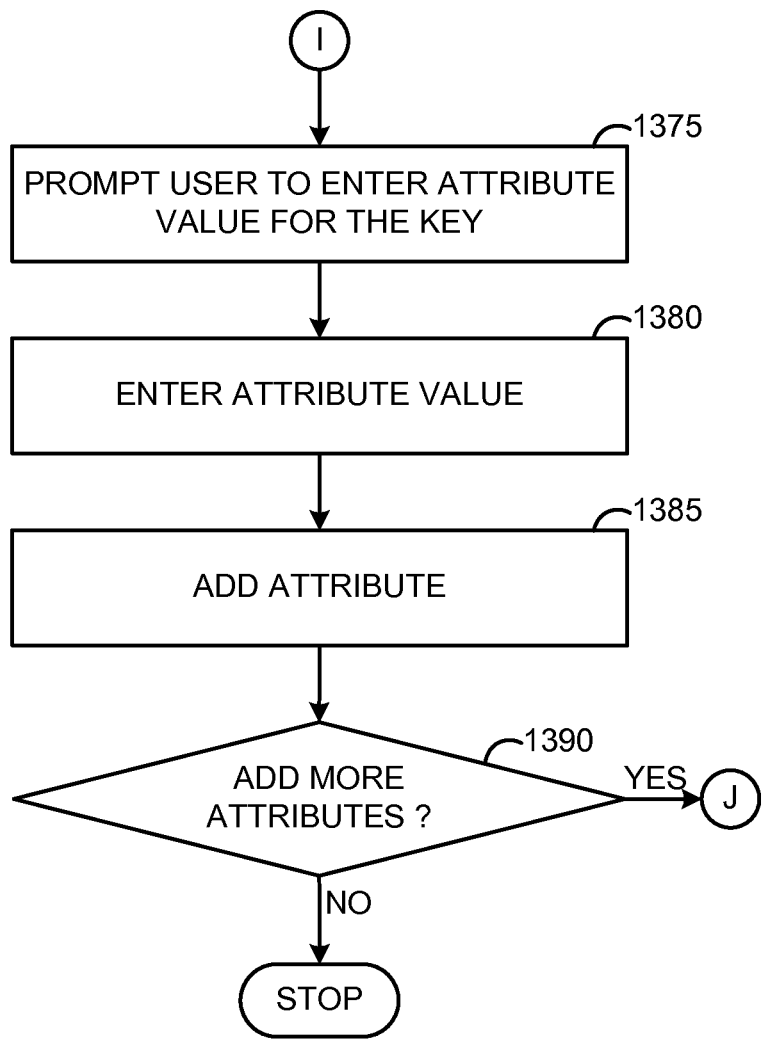

FIGS. 13A, 13B, and 13C are flow diagrams illustrating a process of adding a new association instance, according to an embodiment. At block 1305, a selection of a concept from one or more concepts in the system is received. At block 1310, the user is provided with a list of association types to create an instance of an association type from the list of association types. At block 1315, a selection of an association type is received. At block 1320, the user is provided with a list of instance concepts of type of participating source concept in the selected association type. At block 1325, a selection of an instance concept as source type concept is received.

At block 1330, the user is provided with a list of instance concepts of type of participating target concept in selected association type. Then, a selection of an instance concept as target type concept is received, at block 1335. At block 1340, it is checked if the association type, the source instance concept, and the target instance concept are duplicates. If so, the process is back at block 1320. Otherwise, the process continues at block 1345. At block 1345, association instance description is entered and received. Then, the new association instance is created in the conceptual framework, at block 1350.

Further, the user may want to add one or more attributes for the association instance, at block 1355. Then, the process continues at 1360. Otherwise, the process stops. At block 1360, an attribute key for the association instance is entered and received. At block 1365, it is checked if the attribute key is a duplicate. If so, the process is returned at block 1360 to enter another attribute key for the association instance. At block 1370, it is checked if the attribute key is present in the association type. This is needed because the new attribute has to be checked against the attributed inherited from the selected parent "association type" relationship. If it is already inherited, there is no need to create it again. If the attribute key is present in the association type, the process is again returned at block 1360 to enter another attribute key for the association instance. Otherwise, the process continues at block 1375. At block 1375, the user is prompted to enter an attribute value for the attribute key for the association instance. At block 1380, the attribute value is received. The attribute for the association instance is added, at block 1385. If the user wants to add more attributes (at block 1390), the process is returned at block 1355.

Figure 14:
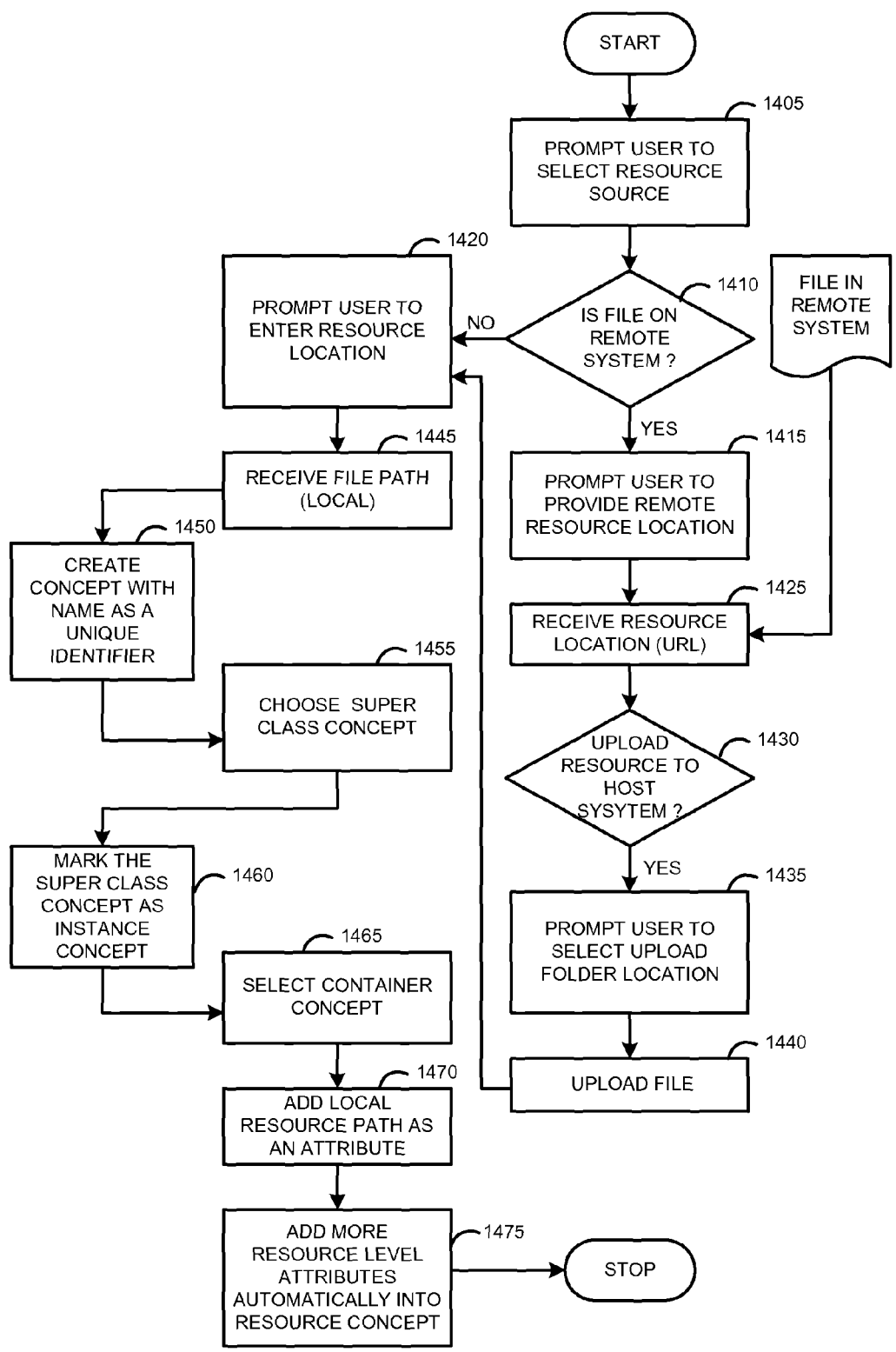
FIG. 14 is a flow diagram illustrating a process of adding a new resource, according to an embodiment.

FIG. 14 is a flow diagram illustrating a process of adding a new resource, according to an embodiment. In various embodiments, the user may add various resources to the conceptual framework (such as files). At block 1405, a selection of a resource source is received. At block 1410, it is checked if the resource is on a remote system. If so, the process continues at block 1415, otherwise at block 1420. At block 1415, the user is prompted to enter a location to the resource (e.g., a uniform resource locator (URL) to the file). At block 1425, the location to the resource is received. At block 1430, a decision is performed whether to upload the resource to the host (local) system. At block 1435, the user is prompted to select a folder location for uploading the resource into that folder. At block 1440, the resource is uploaded into the selected folder of the local system. The process then continues at block 1420.

At block 1420, the user is prompted to enter a path to the resource on the local system. At block 1445, the local resource path is received. At block 1450, a concept with a unique identifier as a name is created. At block 1455, a selection of a super class concept type is received. For example, "file" super class concept, this is a super class concept of type "file". At block 1460, the super class concept type is marked as instance concept. At block 1465, a selection of a container concept for the instance is received. For example, the container concept for a concept of type "file" may be a container concept of type "system". At block 1470, as an attribute is added for the local resource path. At block 1475, a set of resource level attributes are automatically added to the resource concept including, but not limited to, file properties and access permissions.

Figure 15:
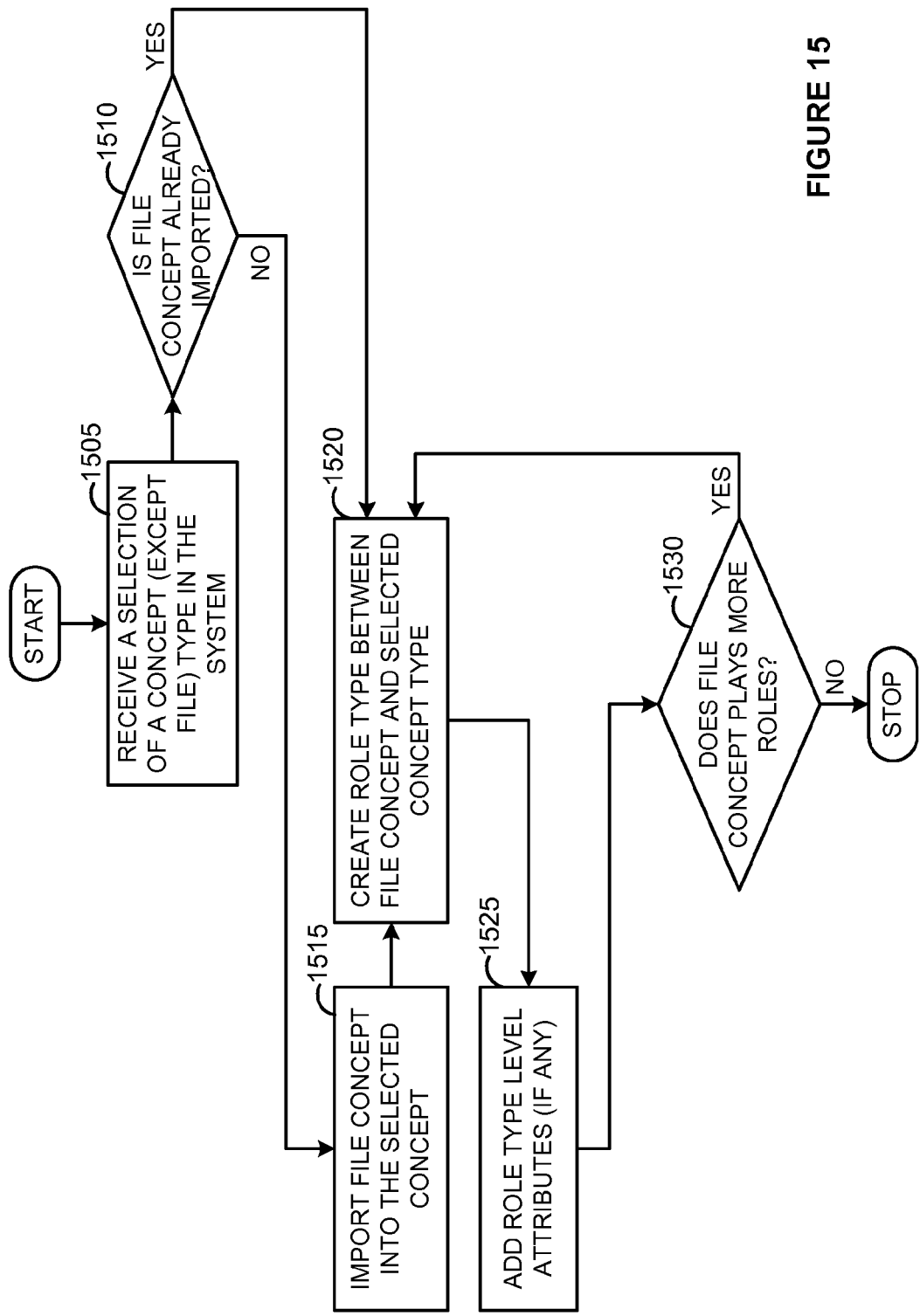
FIG. 15 is a flow diagram illustrating a process of adding a concept-file role type, according to an embodiment.

FIG. 15 is a flow diagram illustrating a process of adding a concept-file role type, according to an embodiment. The concept-file role type defines the role type of the association between a concept and a concept of type "file" (hereinafter "file concept"). Other types of resource concept are also possible. At block 1505, a concept different than a file concept is selected. For example, if the resource concept is of type "file", the selected concept should be of type different than "file". At block 1510, it is checked if a file concept is already imported into the selected concept. If the file concept is not imported, the process continues at block 1515. Otherwise, the process continues at block 1520. At block 1515, the file concept is imported into the selected concept. At block 1520, a role type between the file concept and the selected concept is created. This is further described in the process of FIG. 10. Then, at block 1525, one or more attributes may be added for the created role type. At decision block 1530, it is checked if the file concept plays more roles than the created role type. This means that there may be other role types between the file concept and selected concept. Therefore, the process is returned to block 1520 to create additional role types.

Further, in various embodiments, one or more concept-file role instances can be created. Initially, the user selects a concept. Then, the user is provided with a list of role types, where the file concept is playing a role defined by the respective role type. A new role instance is added in the selected concept's family by selecting the appropriate file type instance. This is further described in FIG. 12. The user may add one or more role instance level attributes.

Figure 16:
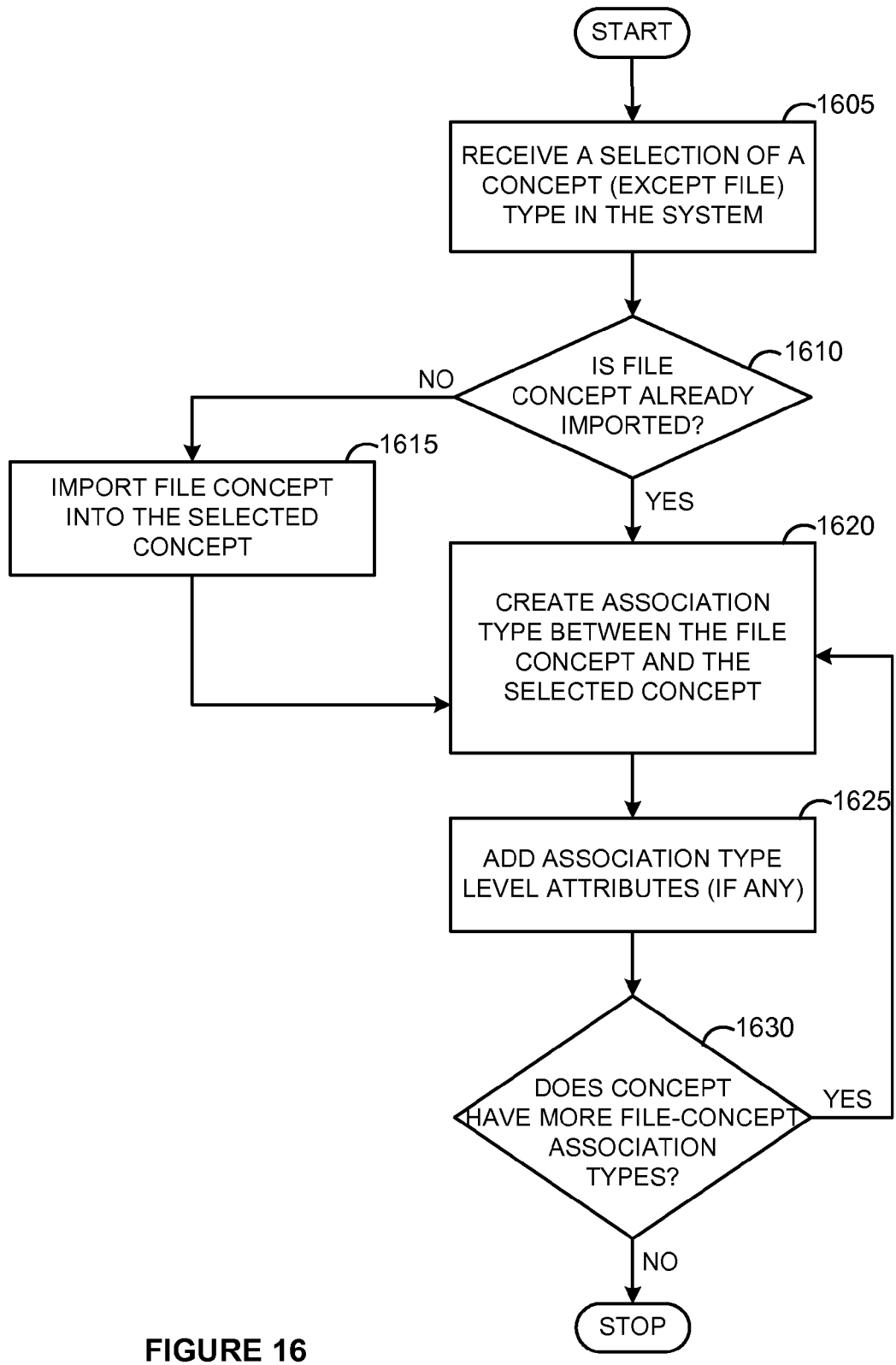
FIG. 16 is a flow diagram illustrating a process of adding a concept-file association type, according to an embodiment.

FIG. 16 is a flow diagram illustrating a process of adding a concept-file association type, according to an embodiment. The concept-file association type defines the association type between a concept and a file concept. Other types of resource concept, than the file concept, are also possible. At block 1605, a concept different than the file concept is selected. At block 1610, it is checked if a file concept is already imported into the selected concept. If the file concept is not imported, the process continues at block 1615. Otherwise, the process continues at block 1620. At block 1615, the file concept is imported into the selected concept. At block 1620, an association type between the file concept and the selected concept is created. This is further described in the process of FIGS. 11A and 11B. Then, at block 1625, one or more attributes may be added for the created association type. At decision block 1630, it is checked if the selected concept has more file-concept associations. This means that there may be other association types between the file concept and selected concept. Therefore, the process is returned to block 1620 to create additional association types.

Further, in various embodiments, one or more concept-file association instances can be created. Initially, the user selects a concept. Then, the user is provided with a list of association types, where the file concept is playing a role defined by the respective association type. A new association instance is added in the selected concept's family by selecting the appropriate file type instance. This is further described in FIGS. 13A, 13B, and 13C. The user may add one or more association instance level attributes.

Figure 17:
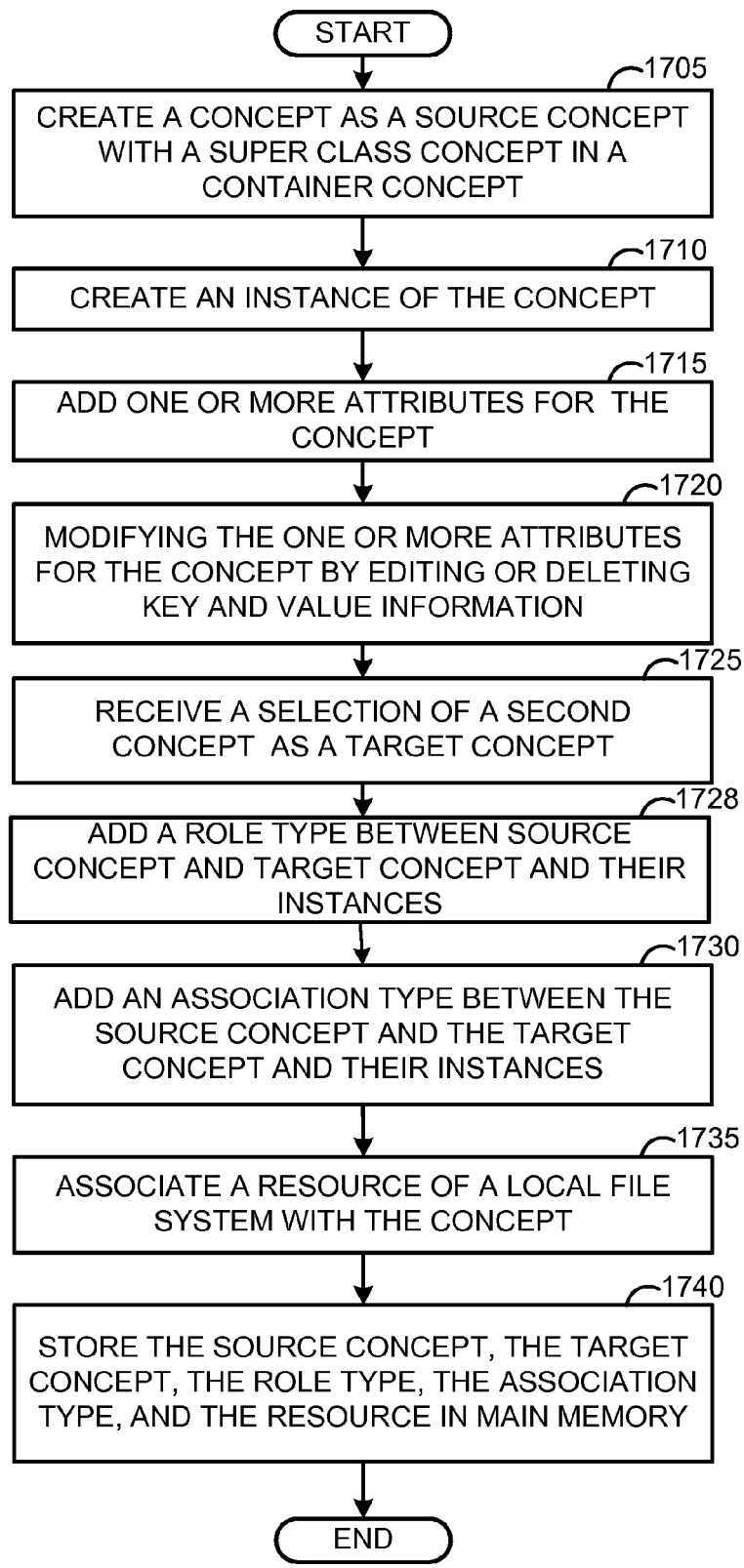
FIG. 17 is a flow diagram illustrating a process of building a conceptual framework, according to an embodiment.

FIG. 17 is a flow diagram illustrating a process of building a conceptual framework, according to an embodiment. In various embodiments, the process of building the conceptual framework is performed through an application deployed on a client system. At block 1705 a concept is created and defined as a source concept. In some embodiments, the concept is created with a super class concept. In other embodiment, the created concept is defined as the super class concept. The super class concept defines a concept that is at higher level than the concept itself in a conceptual hierarchy. In some embodiments, this super class concept may be the root concept of the conceptual hierarchy. Further, the created concept is defined in a container concept of a conceptual hierarchy. The container concept is a compositional concept in a containment hierarchy that may include one or more other concepts.

At block 1710, an instance of the concept is created. One or more attributes can be added for the concept instance, at block 1715. Each attribute is defined with a key and a value. An attribute can be modified by editing or deleting the key and/or the value data, at block 1720. After a change in the attribute is performed, the user has to confirm the change and then the attribute data is updated. At block 1725, a selection of a second concept as a target concept is received. At block 1728, a role type concept between the source concept and the target concept and between the source concept instance(s) and the target concept instance(s) is added to the conceptual framework. At block 1730, an association type between the source concept and the target concept and between their instances is added to the conceptual framework. The association type is based on a role type. The role type defines the type of the role the source concept is playing on the target concept. The association type defines the relationship between two concepts—the source concept and the target concept. In various embodiments, the role type concept is defined as a separate concept.

At block 1735, a resource of a local file system is associated with the created concept. A location of the resource is received. In some embodiments, the resource may be located on a remote system. Thus, the resource is imported in the local file system if the resource is initially located on a remote file system. The resource location is added as an attribute for the source concept. In this way, the physical file is associated with the concept, by adding the resource path as an attribute to the concept. Finally, at block 1740, the source concept, the target concept, the role type, the association type, and the resource are stored in the main memory of the local system.

The processes described in FIGS. 8-17 are based on the data model presented in FIGS. 6A, 6B, and 6C. Further, these processes form the creating of the conceptual framework starting from creating a concept, creating a role type, creating an association between two concepts, adding attributes, and so no. Thus, building the conceptual framework through a conceptual hierarchy, a containment hierarchy, and relationships between concepts and physical files. In various embodiments, the conceptual framework provides a search algorithm that performs a recursive query on the parent concept to get a recursive querying set containing all the child concepts satisfying the given query conditions.

Multiple recursive querying is fast due to the in-memory database and thereby reducing the overall query response time.

The conceptual framework and the file data stored in the in-memory database provides the following functions: 1) fast searching of files, concepts, associations, and relationships in both the conceptual hierarchy and the containment hierarchy; 2) search operations based on complex multivariate queries involving relationships and multiple conditions between concepts; 3) in-memory database based framework and file storage enabling superfast access, reduced file storage redundancy (single instance of file, but multiple associations), reduced updating errors, increased consistency, greater data integrity and independence from application level programs, query-based concept and file access, improved data security, reduced storage costs and data retrieval costs, and so on.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, functional, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 18:
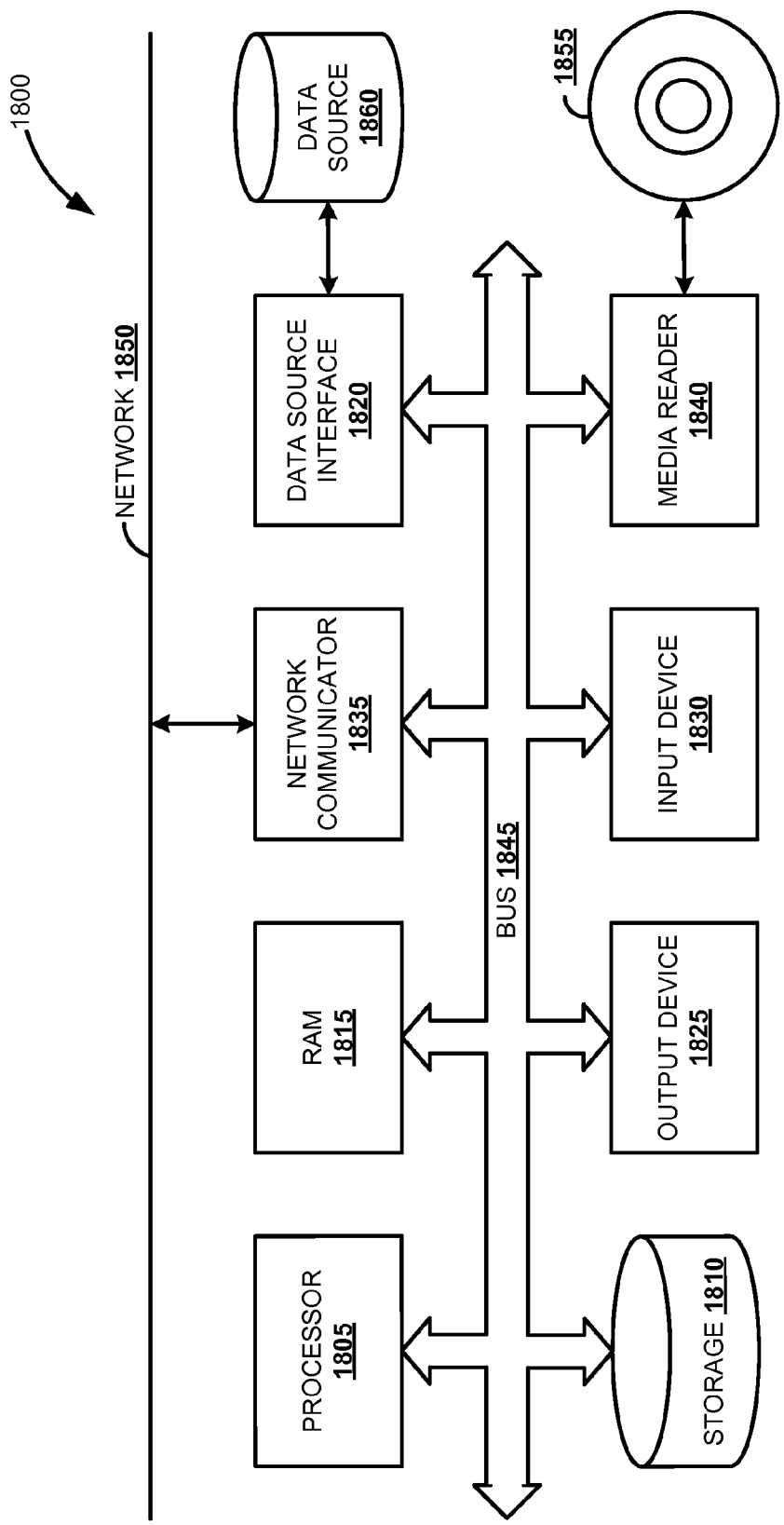
FIG. 18 is a block diagram of an exemplary computer system 1800, according to an embodiment.

FIG. 18 is a block diagram of an exemplary computer system 1800, according to an embodiment. The computer system 1800 includes a processor 1805 that executes software instructions or code stored on a computer readable storage medium 1855 to perform the above-illustrated methods. The processor 1805 can include a plurality of cores. The computer system 1800 includes a media reader 1840 to read the instructions from the computer readable storage medium 1855 and store the instructions in storage 1810 or in random access memory (RAM) 1815. The storage 1810 provides a large space for keeping static data where at least some instructions could be stored for later execution. According to some embodiments, such as some in-memory computing system embodiments, the RAM 1815 can have sufficient storage capacity to store much of the data required for processing in the RAM 1815 instead of in the storage 1810. In some embodiments, all of the data required for processing may be stored in the RAM 1815. The stored instructions may be further compiled to generate other representations of the instructions and dynamically stored in the RAM 1815. The processor 1805 reads instructions from the RAM 1815 and performs actions as instructed. According to one embodiment, the computer system 1800 further includes an output device 1825 (e.g., a display) to provide at least some of the results of the execution as output including, but not limited to, visual information to users and an input device 1830 to provide a user or another device with means for entering data and/or otherwise interact with the computer system 1800. Each of these output devices 1825 and input devices 1830 could be joined by one or more additional peripherals to further expand the capabilities of the computer system 1800. A network communicator 1835 may be provided to connect the computer system 1800 to a network 1850 and in turn to other devices connected to the network 1850 including other clients, servers, data stores, and interfaces, for instance. The modules of the computer system 1800 are interconnected via a bus 1845. Computer system 1800 includes a data source interface 1820 to access data source 1860. The data source 1860 can be accessed via one or more abstraction layers implemented in hardware or software. For example, the data source 1860 may be accessed by network 1850. In some embodiments the data source 1860 may be accessed via an abstraction layer, such as, a semantic layer.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the invention are described herein for illustrative purposes, various equivalent modifications are possible within the scope of the invention, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method, the method comprising:
creating a concept data object with a super class concept in a conceptual hierarchy, wherein creating the concept data object comprises marking the concept data object as a compositional data object or a non compositional data object based upon a user input;
receiving a selection of the concept data object as a source concept;
receiving a selection of a second concept data object as a target concept included in a containment hierarchy, wherein the containment hierarchy is a nested data tree structure that includes concepts and resources of a file storage system modeled as attributes of the concepts with a URL as a key and a file path as a value;
adding an association type between the source concept and the target concept, wherein the association type is based on a selected role concept;
associating a resource of the file storage system with the concept data object;
importing the resource in the local file system, wherein the resource is initially located on a remote file system; and
storing the source concept, the target concept, the role concept, the association type, and the resource in main memory.

2. The method of claim 1, wherein associating the resource comprises:
receiving a location of the resource; and
adding the resource location as an attribute for the source concept.

3. The method of claim 2, further comprising:
selecting a file concept as the super class concept;
marking the file concept as an instance file concept; and
selecting a system concept as the container concept.

4. The method of claim 3, further comprising: automatically adding a set of file properties and a set of access permissions into the file concept.

5. The method of claim 1, further comprising:
adding one or more attributes for the concept data object; and
modifying the one or more attributes for the concept data object by editing or deleting key and value information for the one or more attributes.

6. The method of claim 1 further comprising: creating a role type instance of the role concept that specifies a role that the source concept plays on the target concept, wherein the role concept is defined as a separate concept data object.

7. A computer system, comprising:
a processor;
a memory in communication with the processor, the memory comprising:
a conceptual framework;
a conceptual hierarchy as part of the conceptual framework, wherein a concept data object is created with a super class concept in the conceptual hierarchy, and wherein creating the concept data object comprises marking the concept data object as a compositional data object or a non compositional data object based upon a user input and receiving a selection of the concept data object as a source concept; and
a containment hierarchy as part of the conceptual framework, wherein a second concept is selected as a target concept, wherein an association type between the source concept and the target concept is created, and wherein the association type is based on a selected role concept, and wherein the containment hierarchy is a nested data tree structure that includes concepts and resources of a file storage system modeled as attributes of the concepts with a URL as a key and a file path as a value;
a resource located on a local file system, wherein the resource is imported in the local file system if the resource is initially located on a remote file system; and
a main memory that stores the source concept, the target concept, the role concept, the association type, and the resource.

8. The system of claim 7, wherein a role type instance of the role concept is created that specifies a role that the source concept plays on the target concept, wherein the role concept is defined as a separate concept.

9. The system of claim 7, wherein one or more attributes are added for the concept data object.

10. The system of claim 7, wherein the resource location is added as an attribute for the source concept.

11. The system of claim 7, wherein a set of file properties and a set of access permissions are automatically added into a file concept, wherein the file concept is defined as the super class concept.

12. A non-transitory computer-readable medium storing instructions, which when executed cause a computer system to:
create a concept data object with a super class concept in a conceptual hierarchy, wherein creating the concept data object comprises marking the concept data object as a compositional data object or a non compositional data object based upon a user input;
receive a selection of the concept data object as a source concept;
receive a selection of a second concept data object as a target concept included in a containment hierarchy, wherein the containment hierarchy is a nested data tree structure that includes concepts and resources of a file storage system modeled as attributes of the concepts with a URL as a key and a file path as a value;
add an association type between the source concept and the target concept, wherein the association type is based on a selected role concept;
associate a resource of a local file system with the concept data object;
import the resource in the local file system, wherein the resource is initially located on a remote file system; and
store the source concept, the target concept, the role concept, the association type, and the resource in main memory.

13. The computer-readable medium of claim 12 further comprising instructions that cause the computer system to:
receive a location of the resource; and
add the resource location as an attribute for the source concept.

14. The computer-readable medium of claim 13, further comprising instructions to cause the computer system to:
   select a file concept as the super class concept;
   mark the file concept as an instance file concept; and
   select a system concept as the container concept.

15. The computer-readable medium of claim 14, further comprising instructions to cause the computer system to automatically add a set of file properties and a set of access permissions into the file concept.

16. The computer-readable medium of claim 12 further comprising instructions that cause the computer system to:
   add one or more attributes for the concept data object; and
   modify the one or more attributes for the concept data object by editing or deleting key and value information for the one or more attributes.

17. The computer-readable medium of claim 12, further comprising instructions that cause the computer system to: create a role type instance of the role concept that specifies a role that the source concept plays on the target concept, wherein the role concept is defined as a separate concept.

* * * * *